(12) United States Patent
Joshi et al.

(10) Patent No.: US 12,278,740 B2
(45) Date of Patent: Apr. 15, 2025

(54) AUTOMATING CLOUD SERVICES LIFECYCLE THROUGH SEMANTIC TECHNOLOGIES

(71) Applicant: University of Maryland, Baltimore County, Baltimore, MD (US)

(72) Inventors: Karuna Joshi, Baltimore, MD (US); Timothy Finin, Baltimore, MD (US); Yelena Yesha, Baltimore, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 373 days.

(21) Appl. No.: 17/948,906

(22) Filed: Sep. 20, 2022

(65) Prior Publication Data

US 2023/0171165 A1      Jun. 1, 2023

Related U.S. Application Data

(63) Continuation of application No. 15/963,094, filed on Apr. 25, 2018, now abandoned, which is a continuation of application No. 14/550,264, filed on Nov. 21, 2014, now abandoned.

(51) Int. Cl.
| | |
|---|---|
| *H04L 41/5006* | (2022.01) |
| *G06F 3/0482* | (2013.01) |
| *H04L 41/22* | (2022.01) |
| *H04L 41/5051* | (2022.01) |

(52) U.S. Cl.
CPC .......... *H04L 41/5006* (2013.01); *H04L 41/22* (2013.01); *H04L 41/5051* (2013.01); *G06F 3/0482* (2013.01)

(58) Field of Classification Search
CPC . H04L 41/5006; H04L 41/22; H04L 41/5051; H04L 41/5009; G06F 3/0482; G06Q 30/0611; G06Q 50/10; G06Q 30/0601
See application file for complete search history.

(56) References Cited

U.S. PATENT DOCUMENTS

| | | | |
|---|---|---|---|
| 2012/0042040 A1* | 2/2012 | Bailey ................ | H04L 45/02 709/217 |
| 2015/0379121 A1* | 12/2015 | Akolkar ............. | G06F 16/353 707/723 |
| 2017/0048314 A1* | 2/2017 | Aerdts ................ | G06F 9/5072 |

* cited by examiner

*Primary Examiner* — Tonia L Dollinger
*Assistant Examiner* — Mehulkumar J Shah
(74) *Attorney, Agent, or Firm* — JUNEAU & MITCHELL; Todd L. Juneau

(57) ABSTRACT

This invention relates to methods and systems of procuring services in the cloud and specifically procurement where the requirements are defined by the consumer in a machine understandable knowledge representation language such as RDF and OWL using semantic web technology to establish a cloud agent for discovery of a service provider and effectuate the automatic generation of a contract, or service-level agreement, that can be monitored due to the coupling between the machine understandable knowledge representation language and the contract.

1 Claim, 20 Drawing Sheets

FIGURE 4

| | |
|---|---|
| 402 | HARD CONSTRAINTS:<br>➢ ANNUAL AUDIT – VALID TYPES SAS 70 Type II audit, PCI-DSS, ISO 27001<br>➢ VM SEPARATION<br>➢ DATA DELETION PRIOR TO RESOURCE RELEASE<br>➢ OTHER USE OF DATA WITH PERMISSION<br>➢ CLOUD LOCATION GLOBAL |
| 404 | SOFT CONSTRAINTS:<br>➢ SAS 70 Type II ANNUAL AUDIT<br>➢ VM SEPARATION<br>➢ DATA DELETION SECURE WIPE<br>➢ NO OTHER USE OF DATA<br>➢ CLOUD LOCATION US |

FIGURE 6

```
OWL/XML format
cloudSLA:outage_notification rdf:type owl:DatatypeProperty ;
  rdfs:domain cloudSLA:Service_Support ;
  rdfs:range [ rdf:type rdfs:Datatype ;
     owl:oneOf [ rdf:type rdf:List ;
     rdf:first "00:05:00"^^xsd:time ;
     rdf:rest rdf:nil
        ]
  ].
OWL/N3 format
:resolution_time    a owl:DatatypeProperty;
     rdfs:domain :Service_Support;
     rdfs:range [
        a owl:DataRange;
        owl:oneOf ( "04:00:00"^^xsd:time )].
:response_time    a owl:DatatypeProperty;
     rdfs:domain :Service_Support;
     rdfs:range [
        a owl:DataRange;
        owl:oneOf ( "00:10:00"^^xsd:time )].
```

Outage Notification = 5 minutes

Resolution Time = 4 hours

Response Time = 10 minutes

```xml
<?xml version="1.0"?>
<rdf:RDF
xmlns="http://www.w3.org/2002/07/owl#"
xmlns:xsd="http://www.w3.org/2001/XMLSchema#"
xmlns:dc="http://purl.org/dc/elements/1.1/"
xmlns:rdfs="http://www.w3.org/2000/01/rdf-schema#"
xmlns:itso="http://ebiquity.umbc.edu/ontologies/itso/1.0/itso.owl"
xmlns:stg="http://www.cs.umbc.edu/~kjoshi1/storage_ontology.owl"
xmlns:rdf="http://www.w3.org/1999/02/22-rdf-syntax-ns#">
<rdf:Description rdf:about="http://localhost/RFS">
<itso:RFS_Respond_By_Date> Sun Dec 25 14:48:27 2011
</itso:RFS_Respond_By_Date>
<itso:Expected_Begin_Date_of_Service> 1-1-2012
</itso:Expected_Begin_Date_of_Service>
<itso:Service_Cost_Constraint> 0 </itso:Service_Cost_Constraint>
<itso:Service_Location_constraint> global
</itso:Service_Location_constraint>
<stg:storage> 2GB </stg:storage>
<stg:backup> Weekly </stg:backup>
<stg:availability> 95 </stg:availability>
<stg:datadeletion> data archived </stg:datadeletion>
<stg:Encryption> No Encryption </stg:Encryption>
<stg:authentication> FIPS 140 2 supported </stg:authentication>
<stg:VMseparation> Not needed </stg:VMseparation>
<stg:storage_interface> SOAP WSDL </stg:storage_interface>
<stg:TIC_connection> TIC Compliant </stg:TIC_connection>
<stg:CC_EAL> 3 </stg:CC_EAL>
<stg:cloud_instance_size> 1GB </stg:cloud_instance_size>
<stg:cloud_instance_speed> 1GHz </stg:cloud_instance_speed>
<stg:cloud_instance_cores> 6 </stg:cloud_instance_cores>
</rdf:Description>
</rdf:RDF>
```

FIGURE 19

PREFIX stg: http://www.cs.umbc.edu/~kjoshi1/storage_ontology.owl
PREFIX owls: <http://www.ai.sri.com/daml/services/owl-s/1.2/Profile.owl>
PREFIX sv: <http://www.cs.umbc.edu/~kjoshi1/IT_Service_Ontology.owl>
SELECT ?serviceName ?textDescription ?Cost ?creator ?Backup ?Availability
?Storage_size ?datadeletion ?Encryption ?authentication ?VMseparation ?storage_interface
?TIC_connection ?CC_EAL ?cloud_instance_size
?cloud_instance_speed ?cloud_instance_cores
  { SERVICE <http://eb4.cs.umbc.edu:2020/Storage>
    { SELECT ?serviceName ?textDescription ?creator ?Cost ?Location ?Backup
?Availability ?Storage_size ?datadeletion ?Encryption ?authentication ?VMseparation
?storage_interface ?TIC_connection ?CC_EAL ?cloud_instance_size
?cloud_instance_speed ?cloud_instance_cores
      WHERE
      {?serviceName owls:textDescription ?textDescription .
       ?serviceName sv:creator ?creator . ?serviceName stg:Storage_size ?Storage_size
FILTER regex(?Storage_size, "2GB" ,"i").
?serviceName stg:Cost ?Cost FILTER regex(?Cost, "0" ,"i").
?serviceName stg:Availability ?Availability FILTER regex(?Availability, "95"
,"i").
?serviceName stg:Backup ?Backup FILTER regex(?Backup, "Weekly","i").
?serviceName stg:authentication ?authentication FILTER regex(?authentication,
"FIPS 140 2 supported" ,"i").
?serviceName stg:Encryption ?Encryption FILTER regex(?Encryption, "No
Encryption" ,"i").
?serviceName stg:Location ?Location FILTER regex(?Location, "global" ,"i").
?serviceName stg:datadeletion ?datadeletion FILTER regex(?datadeletion, "data
archived" ,"i").
?serviceName stg:VMseparation ?VMseparation FILTER regex(?VMseparation,
"Not needed" ,"i").
?serviceName stg:storage_interface ?storage_interface FILTER regex (?storage_interface,
"SOAP WSDL" ,"i").
?serviceName stg:TIC_connection ?TIC_connection FILTER regex
(?TIC_connection, "TIC Compliant" ,"i").
?serviceName stg:CC_EAL ?CC_EAL FILTER regex(?CC_EAL, "3" ,"i").
?serviceName stg:cloud_instance_size ?cloud_instance_size FILTER
regex(?cloud_instance_size,
"1GB" ,"i").
?serviceName stg:cloud_instance_speed ?cloud_instance_speed FILTER
regex(?cloud_instance_speed,
"1GHz" ,"i").
?serviceName stg:cloud_instance_cores ?cloud_instance_cores FILTER
regex(?cloud_instance_cores,
"10" ,"i").
}}}

AUTOMATING CLOUD SERVICES LIFECYCLE THROUGH SEMANTIC TECHNOLOGIES

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

None.

BACKGROUND

Field of the Invention

This invention relates to methods and systems of procuring services in the cloud, and specifically procurement where the requirements are iteratively defined by the consumer as constraints in a machine understandable knowledge representation language such as RDF and OWL using SPARQL query language and semantic web technology to establish a cloud agent for discovery of an end point service provider and effectuate the automatic generation of a contract, or service level agreement, that can be monitored due to a couple between the machine understandable knowledge representation language and the contract.

Background of the Invention

Service level negotiation is done manually between procurement people in the provider and consumer side. That at times takes days (if not months) of negotiation and requires exchange of paper-based service level agreements and contracts. Automated negotiation that we are proposing will enable almost real-time negotiation and will allow exchange of machine-readable service level agreements and contracts which can also be monitored on real-time basis.

BRIEF SUMMARY OF THE INVENTION

The novel component of this work comprises automated service-level negotiation between a service provider and consumer through the exchange of machine-understandable service-level agreements and contracts that can be monitored on real-time basis.

In one preferred embodiment, the invention provides a method of facilitating user interactions with a graphical user interface, the graphical user interface being generated and rendered on a display of an electronic device, by executing a software product on a computing hardware of the electronic device, the computing hardware, graphical user interface and the software product being implemented on a user computer system that is operatively connected to a network of remote internet computers, the method comprising the following steps:

i. rendering a plurality of graphical objects within the graphical user interface, said graphical objects comprising a request for service object, a discover services object, a negotiate service level agreement object, a compose services object, a service attributes object, and a data and security policies object;

ii. specifying a combination of functional and non-functional requirements in a machine understandable knowledge representation language to generate a document that forms an initial soft constraints group by detecting a selection of one or more service attribute constraints within the service attributes graphical object, and detecting a selection of one or more data and security policy constraints within the data and security policies graphical object, the machine understandable knowledge representation language selected from the group consisting of: RDF, OWL, and the functional equivalents of RDF and OWL;

iii. using semantic web technology to form a federated SPARQL query cloud agent representing the initial soft constraints group and sending a Request for Service from the user computer system to a plurality of remote service provider accessible by the network of remote internet computers, wherein said Request for Service specifies the requirements of the initial soft constraints group;

iv. rendering a list of matching services within the graphical user interface for service providers that match the initial soft constraints group, and where the list of matching services contains at least one service provider, v. automatically generating a service level agreement based upon a user accepting an offer of service from a service provider that is listed in the list of matching services; and where the list of matching services contains zero service providers, iteratively performing step vi, until the list of matching services contains one or more service providers;

vi. removing one of the service attribute constraints or one of the data and security constraints and generating at least one secondary federated SPARQL query cloud agent, wherein at least one secondary Request for Service is sent from the user computer system to a plurality of remote service providers accessible by the network of remote internet computers, wherein said Request for Service specifies at least one secondary (relaxed) constraints group, and rendering a list of matching services within the graphical user interface for service providers that match the at least one secondary constraints group; and vii. automatically generating a service level agreement based upon a user accepting an offer of service from a service provider that is listed in the list of matching services containing one or more service providers;

wherein the user computer system is in direct communication with the at least one service provider or the one or more service providers substantially free of an intermediary service level agreement broker; and, wherein the service specified by the initial soft constraints group or by the at least one secondary relaxed constraints group is not a pre-existing service and is not specified until the service level agreement is generated.

In another preferred embodiment, the invention provides a method of procuring services in the cloud wherein a consumer has a first computing system and a Cloud service provider has a second computing system, each of the first and second computing system operatively associated with a communication network and having one or more applications running thereon, comprising the steps of: defining consumer requirements of a requested cloud service in a machine readable language specified in RDF and OWL using semantic web technology to establish a cloud agent for discovery of a cloud service provider that will provide cloud services according to the consumer requirements of the requested cloud service; and automatically generating a contract, or service level agreement using said machine understandable knowledge representation language consumer requirements between said consumer and said cloud service provider.

In another preferred embodiment, the invention also comprises wherein the contract or service level agreement is monitored after the agreement is established using a RDF graph couple between the machine understandable knowledge representation language and the contract. The contract specifies both functional and non functional (e.g. security, compliance, cost) requirements.

In another preferred embodiment, the invention also comprises wherein deviations from the agreement are automatically identified and reported to representatives of the client and/or the service provider.

In another preferred embodiment, the invention also comprises wherein the elements of the system and the requirements are described from terms in an ontology.

In another preferred embodiment, the invention also comprises wherein the contract is between a single consumer and a single Cloud service provider.

In another preferred embodiment, the invention also comprises wherein the consumer is in direct communication with the Cloud service provider substantially free of an intermediary broker.

In another preferred embodiment, the invention also comprises wherein the Cloud service is a virtualized service on demand wherein the service is not created until the contract or service level agreement is generated. The service level agreement specifies the attributes of the service to be created.

In another preferred embodiment, the invention also comprises wherein the service does not preexist, but is composed from existing component services based on the consumer requirements as specified.

In another preferred embodiment, the invention also comprises wherein a service satisfying the requirements does not exist, and where the consumer and service provider or the consumer and broker automatically negotiate on the said requirements specified in a machine understandable language till either an appropriate service is found or the negotiation terminates.

In another preferred embodiment, the invention also comprises wherein the service is selected from the group consisting of: PAAS (platform as a service), IAAS (Infrastructure as a service) and SAAS (software as a service).

In another preferred embodiment, the invention also comprises wherein the service is selected from the group consisting of specific apps: CRM, Document/Content management, collaboration, healthIT, Collaboration, security, IT service management, HR and productivity software.

In another preferred embodiment, the invention also comprises wherein the service is selected from the group consisting of specific apps: ERP and Financials.

In a further preferred embodiment, the invention provides A method of facilitating the bilateral generation of a service level agreement between a service consumer and a service provider, wherein the service consumer interacts with a graphical user interface, the graphical user interface being generated and rendered on a display of an electronic device, by executing a software product on a computing hardware of the electronic device, the computing hardware, graphical user interface and the software product being implemented on a service consumer computer system that is operatively connected to a network of remote internet computers, and a plurality of remote service providers accessible by the network of remote internet computers, the method comprising the following steps:

i. rendering a plurality of graphical objects within the graphical user interface of the service consumer, said graphical objects comprising a request for service object, a discover services object, a negotiate service level agreement object, a compose services object, a service attributes object, and a data and security policies object;

ii. specifying a combination of functional and non-functional requirements in a machine understandable knowledge representation language to generate a document that forms a first constraints group by detecting a selection of one or more service attribute constraints within the service attributes graphical object, and detecting a selection of one or more data and security policy constraints within the data and security policies graphical object, the machine understandable knowledge representation language selected from the group consisting of: RDF, OWL, and the functional equivalents of RDF and OWL;

iii. using semantic web technology to form a federated SPARQL query cloud agent representing the first constraints group and sending a Request for Service from the service consumer computer system to the plurality of remote service providers, wherein said Request for Service specifies the requirements of the first constraints group;

iv. receiving at the computer system of the service consumer a list of matching services for service providers that match the first constraints group, and where the list of matching services contains zero service providers;

v. removing one of the service attribute constraints or one of the data and security constraints from the first constraints group and generating a secondary federated SPARQL query cloud agent, wherein the secondary federated SPARQL query cloud agent is a Request for Service generated and sent from the service consumer or an Offer for Service generated and sent from the service provider, wherein said Request for Service or said Offer for Service specifies a second constraints group;

vi. rendering within the graphical user interface of the service consumer a list of matching service providers resulting from the Request for Service, and where the list of matching services contains at least one service provider, automatically generating a service level agreement based upon a user accepting an offer of service from a service provider that is listed in the list of matching services; or automatically generating a service level agreement based upon the service consumer accepting the Offer for Service from the service provider; wherein the service consumer computer system is in direct communication with the service providers and substantially free of an intermediary service level agreement broker; and, wherein the service specified by the first constraints group or by the second constraints group is not a pre-existing service and is not specified until the service level agreement is generated.

In another preferred embodiment, the method of facilitating the bilateral generation of a SLA further includes the step of iteratively performing steps v) and vi) until a service level agreement is generated, where the initial steps do not result in an SLA.

BRIEF DESCRIPTION OF THE DRAWINGS

FIG. 4 illustrates how a consumer can specify the hard and soft constraints for a cloud service

FIG. 6 is a section of the SLA specifying service support constraints.

FIG. 15 is a screen shot of an example of a prototype graphical user interface where in Negotiation, the Constraints are relaxed until a Service is found.

FIG. 16 is a screen shot of an example of a prototype graphical user interface where an RDF file of the finalized SLA is stored in a Fuseki graph store.

FIG. 18 is a printout showing an example of an RDF/XML, document that is generated for the attributes selected in FIG. 17.

FIG. 19 is a printout showing an example of a federated SPARQL query that is generated based on selections made in the prototype.

FIG. 20 shows how each consumer and provider can dynamically re-check their negotiating position during various iterations by comparing to external values provided by re-running a previous search agent and/or by re-comparing against certain metrics, such as ability to perform, market availability of competitors, pricing changes, and so forth.

DETAILED DESCRIPTION OF THE INVENTION

Definitions

Figure 1:
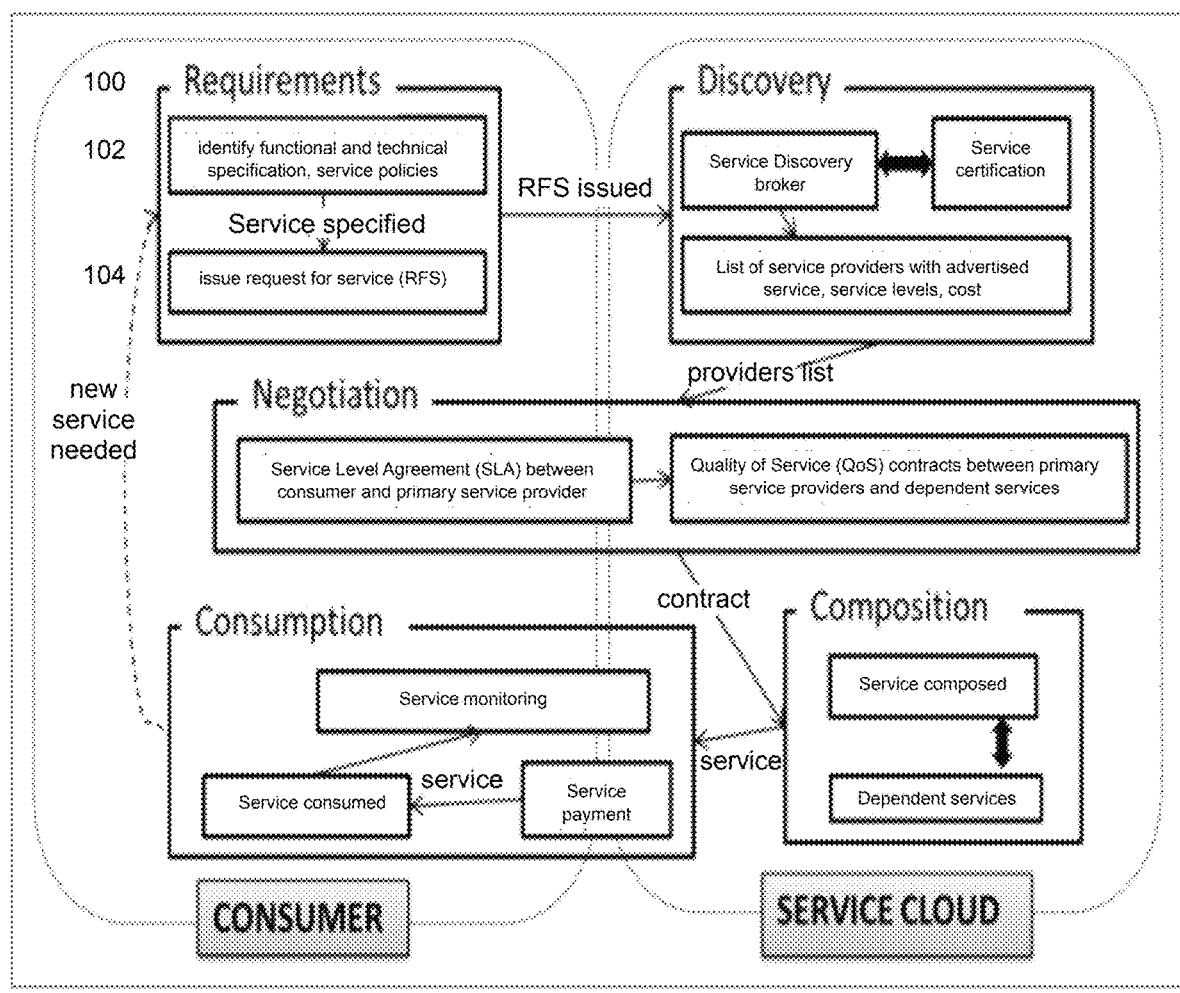
FIG. 1 is a graphic and shows an example of how the IT service lifecycle on a cloud comprises five phases: requirements; discovery: negotiation; composition; and consumption.

The term semantic technology or technologies relates to software that encodes meanings separately from data and content files, and separately from application code. This enables machines as well as people to understand, share and reason with them at execution time. With semantic technologies, adding, changing and implementing new relationships or interconnecting programs in a different way can be just as simple as changing the external model that these programs share. With traditional information technology, on the other hand, meanings and relationships must be pre-defined and "hard wired" into data formats and the application program code at design time. This means that when something changes, previously unexchanged information needs to be exchanged, or two programs need to interoperate in a new way, the humans must get involved. Off-line, the parties must define and communicate between them the knowledge needed to make the change, and then recode the data structures and program logic to accommodate it, and then apply these changes to the database and the application. Then, and only then, can they implement the changes. Semantic technologies are "meaning-centered." They include tools for: autorecognition of topics and concepts, information and meaning extraction, and categorization. Given a question, semantic technologies can directly search topics, concepts, associations that span a vast number of sources. Semantic technologies provide an abstraction layer above existing IT technologies that enables bridging and interconnection of data, content, and processes. Second, from the portal perspective, semantic technologies can be thought of as a new level of depth that provides far more intelligent, capable, relevant, and responsive interaction than with information technologies alone.

The term semantic web technology refers to a standards based method of publishing (web pages) in languages specifically designed for data, such as, but not limited to, Resource Description Framework (RDF), Web Ontology Language (OWL), and Extensible Markup Language (XML). The languages provide machine readable descriptions that allow computers to perform automated tasks such as information gathering, researching, etc.

The term ontology or ontology language, as used herein in the field of computer science, refers to a mechanism to limit complexity and to organize information by using a specific vocabulary for the formal naming and defining of types of entities, properties of entities, and interrelationships between entities. Specifically, for the semantic web, it requires publishing in languages specifically designed for data and includes Resource Data Framework (RDF) language, and Ontology Web Language (OWL). Using RDF and OWL enables a user to describe content within a document but also to describe the structure of the knowledge about the content, i.e. the meaning, which thus allows a computer to perform automated information gathering and research within the web or cloud. By combining content and structure within a single automated search, the computer approximates the functions of deduction and inference, and markedly improves the ultimate search results by providing more meaningful results. The term SPARQL refers to an acronym for a (Standard?) Protocol And RDF Query Language for accessing RDF, and which was designed and maintained by the W3C RDF Data Access Working Group, the details at www.w3.org.standards/techs/sparq1#w3c_all, incorporated herein by reference in its entirety. SPARQL is data-centric and only queries information held in an RDF graph (database) (model) and only returns information in the form of a set of bindings or an RDF graph, for example a table of results (SELECT), an PDF graph based on a template (CONSTRUCT), an RDF graph based on a pre-configured query processor (DESCRIBE), or a Boolean query (ASK).

Organizations have complex enterprise data policies, as well as legal and statutory constraints, that require compliance. Such policies are today enforced on internal resources that are completely controlled by the organization. On moving to a cloud based solution, the organization has to often hand over this control to the service provider. Hence, acquiring cloud services requires significant human intervention and negotiation-people have to check whether a provider's service attributes ensure compliance with their organization's constraints. It is critical to ensure security and privacy of data on the cloud. In fact security concerns are one of the key adoption barriers of cloud services, especially for public or hybrid cloud deployments. Multi-tenancy related security/isolation issues and cross domain cloud access/authorization are some of the important privacy issues that organizations are concerned about. Critical security and privacy policies must be defined by an organization that is adopting cloud computing to ensure their enterprise data policies and constraints are addressed by the cloud provider. These data security and data privacy policies are part of an essential check list that should be referred to by every organization migrating to the cloud.

Data Security policies include
1. Cloud Data Location policy—e.g. US jurisdiction, Europe jurisdiction, Global etc.
2. Data Deletion policy—e.g. Data Archived, Secure wipe, etc.
3. Data Encryption policy—includes Encryption Key management
4. Identity Management policy: a) Authentication Mechanism (e.g. ID/Password, SmartCard (CatCard), PIN, etc.) b) Authorization Methods (e.g. Limited Administrator Access, Group Level Access, Need-to-know access-Individual based)
5. Service Level Agreement (SLA) Monitoring plan-critical to ensure performance and ROI
6. Incident response—Cloud support SLAs should include a) Availability timeframe of services b) Contingency (Business Continuity) plans c) Timeframes for notification and recovery following an unplanned service disruption or a security incident d) Problem resolution and escalation procedures e) Scheduled maintenance times.
7. Cloud Forensics-track data access, specifically hacking attacks.
8. Cloud Data Audit-track cloud data usage, update, by user, by application etc.

Data Privacy policies include:
1. Privacy policy on data access across services, across consumers, a. Personal Identity Information (PII) data policy
2. Virtual Machine Separation
3. Controlled Multi-tenancy—e.g. restrict tenancy of organizations not following compliance.
4. Disclosure Risk Assessment a. Existing Data—e.g. data breach by authenticated users etc. b. Inferred Data—e.g. released data can be combined with social media data to get PII.

Automating Cloud Services Lifecycle Through Semantic Technologies

Managing virtualized services efficiently over the cloud is an open challenge. Traditional models of software development are not appropriate for the cloud computing domain, where software (and other) services are acquired on demand. A new integrated methodology is described for the lifecycle of IT services delivered on the cloud, and demonstrates how it can be used to represent and reason about services and service requirements and so automate service acquisition and consumption from the cloud. The IT service lifecycle is divided into five phases of requirements, discovery, negotiation, composition, and consumption. Each phase is detailed herein and the ontologies that have been developed to represent the concepts and relationships for each phase are described. To show how this lifecycle can automate the usage of cloud services, a cloud storage prototype is described. This methodology complements previous work on ontologies for service descriptions in that it is focused on supporting negotiation for the particulars of a service and going beyond simple matchmaking.

Information Technology (IT) as a service delivered to the end user is a paradigm shift that is fast changing the way businesses looks at the role of IT within the organization. The outsourcing model is being replaced by a new delivery model where businesses purchase IT components like software, hardware or network bandwidth as services from providers, who can be based anywhere in the world. The service is acquired on an as needed basis and can be termed as service on demand. Typically the service is hosted on a Cloud or a computing grid and is delivered to the organization via the Internet or mobile devices.

In such scenarios, multiple providers often collaborate to create a single service for an organization. In some cases businesses utilize multiple service providers to mitigate risks that may be associated with a single provider. In other cases, a business may use a single provider who in turn utilizes the services of other providers. In either case, the delivery of IT service is moving away from a single provider mode, and is increasingly based on the composition of multiple other services and assets (technological, human, or process) that may be supplied by one or more service providers distributed across the network—in the cloud. Moreover, a single service component could be a part of many composite services as needed. The service, in effect, is virtualized on the cloud [38]. It is becoming the preferred method to deliver services ranging from helpdesk and back-office functions to Infrastructure as a Service (IaaS). The virtualized model of service delivery also extends to IT Enabled Services (ITeS), which typically include a large human element.

One consequence of this development is that the consumers now have more choices of service providers that they can select from. However, at present most of the services are delivered as web services providing a singular functionality. Often, the onus is on the consumer to procure these web services individually and then integrate them per the requirements. There has been some work in creating brokers that would perform this functionality. However, such brokers work only on a fixed, linear description of service functionality which often fails to capture the complete requirements of the service needed, and the flexibility a consumer might have. In order to be able to take advantage of virtualized service models, it is imperative for the consumer to be able to identify all the constraints or assertions of a service that need to be met along with its functional requirements.

Large organizations are interested in acquiring cloud services, especially from public cloud providers, and it has been observed that a key barrier preventing organizations from successfully managing virtualized services on the cloud is the lack of an integrated methodology for service creation and deployment that would provide a holistic view of the service lifecycle on a cloud. The invention provided herein presents a methodology to address the lifecycle issue for virtualized services delivered from the cloud. The use of semantically rich descriptions of the requirements, constraints, and capabilities are needed by each phase of the lifecycle. This methodology is complementary to previous work on ontologies, like OWL-S, for service descriptions in that it is focused on automating processes needed to procure services on the cloud. Multiple iterations of service negotiation are enabled with constraints being relaxed iteratively till a service match is obtained. In section 3, the high level ontologies are presented that have been created for the various phases in the invention, and show where existing ontologies can be leveraged. It is contemplated as within the scope of the invention that these can be reasoned over to automate the phases guided by high level policy constraints provided by consumers, service customers, or service providers. The inventive methodology enables practitioners to plan, create and deploy virtualized services successfully.

One key reason to have a semantically rich approach to describe cloud attributes and Service Level Agreements (SLA) is to permit distributed clients and cloud service providers to "automate" the process of acquisition and consumption of services. Without a semantic approach that will permit the providers and consumers to understand each other, which is the present state of the practice, the acquisition process is done manually, and the consumption/monitoring process also requires significant manual input. For instance, National Institute of Standards and Technology (NIST) has identified ambiguity in cloud SLAs currently offered by cloud providers as one of the factors that prevent broad cloud adoption by large organizations, especially federal agencies. It is very difficult to compare SLAs offered by two cloud providers to determine who is offering the better deal. Also, existing cloud SLAs (for instance SLA provided by Amazon at http://aws.amazon.com/ec2-sla/) are provided as a text document making it open to interpretation and very difficult to monitor SLA performance and adherence by the cloud provider. Additionally, survey of industry sources also indicates overall dis-satisfaction among cloud users of existing cloud SLA.

A cloud storage service prototype has been developed and implemented to demonstrate and evaluate our methodology. The prototype allows cloud consumers to discover and acquire disk storage on the cloud by specifying the service attributes, security policies and compliance policies via a simple user interface. W3C standard Semantic Web technologies were used, such as Web Ontology Language (OWL), Resource Description Framework (RDF), and SPARQL, to develop our prototype system since it enables a user to build the vocabulary (or ontology) of a service lifecycle using standardized languages that supports design requirements, which include interoperability, sound semantics, Web integration, and the availability of tools and system components.

One fundamental requirement is for a representation that supports interoperability at both the syntactic and semantic levels. The OWL language has a well-defined semantics that is grounded in first order logic and model theory. This allows programs to draw inferences from OWL expressions with the assurance that the subsequent interpretation is sound. An important advantage for OWL over many other knowledge-based systems languages is that there are well defined subsets that guarantee sound and complete reasoning with various levels of complexity (e.g., N2ExpTime for OWL 2 DL). Moreover, there are also profiles that are tuned to work well with popular implementation technologies, e.g., OWL QL for databases and OWL RL for rule-based systems.

A second design requirement is for a language that is designed to integrate well with the Web, which has become the dominant technology for today's distributed information systems. OWL is built on basic Web standards and protocols and is evolving to remain compatible with them. It is possible to embed RDF and OWL knowledge in HTML pages and several search engines (including Google) will find and process some embedded RDF. RDF is also compatible with Microdata, a Web Hypertext Application Technology Working Group HTML specification that is used to nest semantic statements within existing content on web pages. Microdata has been adopted by Schema.org, collaboration by Google, Microsoft, and Yahoo!, and has been used to define a number of basic ontologies that are being supported by search engines.

Finally, there are a wide variety of both commercial and open sourced tools that support Semantic Web languages and systems including knowledge base editors, reasoners, triple stores, SPARQL query engines (including some that support federated queries), ontology mapping, etc. Several database vendors, including Oracle and IBM, have sophisticated support for representing RDF and OWL, including reasoning.

Since cloud computing is a nascent field, there is lack of standardization and a need has been felt to clearly define its key elements. NIST has recently released a special publication 800-145 defining cloud computing as a model for enabling ubiquitous, convenient, on-demand network access to a shared pool of configurable computing resources (e.g., networks, servers, storage, applications, and services) that can be rapidly provisioned and released with minimal management effort or service provider interaction. One of the key characteristics identified by NIST is that a cloud service should have the capability of on-demand self-service whereby a consumer can unilaterally provision computing capabilities, such as server time and network storage, as needed automatically without requiring human interaction with each service provider. Currently it is very difficult for organizations to specify their data, security, privacy and compliance policies while automatically provisioning cloud services. This invention has addressed this in the inventive framework described in the next section.

In addition to the standard definition of Cloud Computing, NIST has also released the Cloud Computing Reference Architecture document that describes a reference architecture for cloud computing and also the key roles and responsibilities of stakeholders. Since the inventor was part of the NIST cloud computing reference architecture and taxonomy working group that participated in developing the standard, the NIST cloud computing standards are referenced to develop the ontology that is described in the next section.

Current research on cloud or web services so far has been limited to exploring a single aspect of the lifecycle like service discovery, service composition or service quality. There is no integrated methodology for the entire service lifecycle covering service planning, development and deployment in the Cloud. In addition, most of the work is limited to the software component of the service and does not cover the service processes or human agents which are a critical component of IT Services.

Some have proposed a methodology for developing and deploying web services using service oriented architectures. Their approach, however is limited to the creation and deployment of web services and does not account for virtualized environment where services are composed on demand. Providers may need to combine their services with other resources or providers' services to meet consumer needs. Other methodologies do not provide this flexibility and are limited to cases where a single service provider provides one service. Some attempt to address the quality based selection of composite services via a global planning approach but do not cover the human factors in quality metrics used for selecting the components. Others propose an ontology to capture quality of a web service so that quality attributes can be used while selecting a service. While their ontology may be useful as a building block, it is limited by the fact that it considers single web services, rather than service compositions.

Some have proposed an integrated model for IT service management. Their model is limited to managing the service from the service provider's perspective. Others have described a framework for negotiation of web services using the iterated Contract Net Protocol (CNP). However their implementation is limited to pre-existing web services and doesn't extend to virtualized services that are composed on demand. The inventive negotiation protocol detailed in next section accounts for the fact that the service will be composed only after the contract/SLA listing the constraints is finalized. Some ontologies are developed for E-commerce to describe products. While these ontologies are useful for describing service components that already exist on the cloud, it is difficult to describe composite virtualized services being provided by multiple vendors using this ontology.

Grid computing has examined on-demand provisioning and service discovery/composition but has primarily concentrated on addressing issues from cloud provider's perspective. Given the origins of Grid computing in the scientific computing domain, this makes perfect sense. However, issues related to policies of the consumer and the service acquisition processes are ignored. This issue is approached from a holistic viewpoint of both the consumer as well as the provider. The invention also contemplates the use of virtualized services that will be created by combining preexisting components.

The Information Technology Infrastructure Library (ITIL) is a set of concepts and policies for managing IT infrastructure, development and operations that has wide acceptance in the industry. The latest version of ITIL lists policies for managing IT services that cover aspects of service strategy, service design, service transition, service operation and continual service improvement. However, it is limited to interpreting "IT services" as products and applications that are offered by in-house IT department or IT consulting companies to an organization. This framework in its present form does not extend to the service cloud or a virtualized environment that consists of one or more composite services generated on demand.

2.1 Semantic Web

As explained, Semantic Web technologies are used to develop the services lifecycle and prototype development. Semantic Web enables data to be annotated with machine understandable metadata, allowing the automation of their retrieval and their usage in correct contexts. Semantic Web technologies include languages such as RDF and OWL for defining ontologies and describing meta-data using these ontologies as well as tools for reasoning over these descriptions. OWL is based on Description Logic (DL) with a representation in RDF. OWL Semantic Web knowledge can also be encoded in rule format using several approaches, including N3-logic rules, SWRL rules and RIF, the new W3C standard for Rule Inter-change Formalism. These technologies can be used to provide common semantics of Service information and policies enabling all agents who understand basic Semantic Web technologies to communicate and use each other's data and Services effectively.

Several OWL ontologies have been developed to describe Services, including Ontology Web Language for Services (OWL-S) and Semantic Annotations for WSDL and XML Schema (SAWSDL). OWL-S allows Service providers or brokers to define their Services based on agreed upon ontologies that describe the functions they provide. The OWL-S ontology has been integrated into our ontology and it is described below. SAWSDL defines mechanisms using which semantic annotations can be added to WSDL components.

SPARQL Protocol and RDF Query Language (SPARQL) is the query language for RDF that has been standardized by W3C. SPARQL can be used to express queries across diverse data sources, whether the data is stored natively as RDF or viewed as RDF via middleware. The results of SPARQL queries can be results sets or RDF graphs. A SPARQL endpoint is a conformant SPARQL protocol service as defined in the SPARQL Protocol for RDF (SPROT) specification. It enables users to query a knowledge base via the SPARQL language. Results are typically returned in one or more machine processable formats. Therefore, a SPARQL endpoint is mostly conceived as a machine-friendly interface towards a knowledge base.

Service Descriptions specify the capabilities of a SPARQL endpoint. They provide a declarative description of the data available from an endpoint, the definition of limitations on access patterns and statistical information about the available data that is used for query optimization.

Proposed Service Lifecycle Ontology

Traditional models of software development, like the waterfall method or the spiral method, consists of phases like planning, analysis, design, testing and acceptance. These methodologies are found to be very time consuming and require extensive human labor, both from the software application consumer as well as the provider. Cloud computing environment promises agility, elasticity and quick turnaround time for provisioning resources and services. Virtualized services that provide 'on-demand' service on the cloud are mainly built by combining pre-existing components that are developed by same or multiple providers. In this scenario, following traditional software lifecycle methodologies will significantly slow the service delivery time thereby rending the service provider uncompetitive in the cloud market. Hence we believe a radically different methodology is needed for cloud based services.

To develop this ontology, various large organizations who are interested in acquiring cloud based services were contacted. Among our chief collaborators were NIST, University of Maryland Baltimore County (UMBC)'s division of IT, and a large international financial organization with global presence. Additionally, extensive experience in managing large IT services are mostly likely necessary when developing this framework. While developing the ontology, NIST's cloud computing reference architecture was referred to, to identify the key stakeholders in the lifecycle.

The virtualized service lifecycle on a cloud was divided into five phases. In sequential order of execution they are requirements, discovery, negotiation, composition, and consumption. The focus for this framework is the lifecycle for virtualized cloud services—where the services are composed by combining pre-existing components. Hence this lifecycle does not include any requirements analysis or design phases. It is assumed that services, that are designed using a variety of existing approaches, will be described using our ontology—something that can be done post facto—and will be discoverable using standard (web) service type mechanisms (e.g. UDDI, SLP . . . ). It is also contemplated as within the scope of the invention to permit these services to be arbitrarily composed to create new services. It is believed that this hews closely to the cloud model—a provider has a set of available services which can be made available as is, or in combination with other services. A survey of current cloud based offerings has shown that majority of the cloud services consist of pre-existing components with minimal configuration capability and so this is what the consumers are currently interested in from cloud providers.

For clarification, the inventive ontology does not describe the service, but defines the data and processes needed to automate the acquisition and consumption of cloud services. The processes of acquiring such services are largely independent of the type of cloud service (IaaS, SaaS, PaaS), cloud deployment (private, public, hybrid) or service domain (computing services, healthcare, financial services etc.). This framework assumes that users will be defining the ontologies for functional and technical specifications for the service which will obviously vary for different domains. There is a significant body of work (e.g. SAWSDL, WSDL-S, WSMO . . . ) that provides ontologies to describe specific services in terms of their functional and technical specifications. This framework makes it possible to integrate these functional and technical specifications with other enterprise specific policies defined using the ontologies we provide (like privacy, security, compliance, human agent policies) in the requirements phase. And so only the functional description of the requirements phase ontology will have to be defined for each service. Our prototype described in next section is an example, where, for completeness, we have also described the service itself to show how our overall framework would work.

Referring now to the FIGURES, the five phases are described in detail along with the associated metrics. FIG. 1 is a pictorial representation detailing the processes and data flow of the five phases. In the following sections we present the pictorial representations of high-level ontologies that have been created for each phase. The ontology has been developed for the entire lifecycle in OWL 2 DL profile.

Service Requirements Phase

In the service requirements phase 100 the consumer details the technical and functional specifications 102 that a service needs to fulfill. While defining the service requirements, the consumer also specifies non-functional attributes like characteristics of the human agent providing the service, constraints and preferences on data quality and required security policies for the service. Service compliance details like certifications needed, standards to be adhered to etc. are also identified. The technical specifications lay down the hardware, software, application standards and language support policies to which a service should adhere. Once the consumers have identified and classified their service needs, they issue a Request for Service (RFS) 104. This RFS can be generated in a machine readable format using Semantic Web technologies and this has been illustrated in the next section.

Majority of the users will not have static requirements and might not be able to initially articulate all their needs. Also, the requirements will continue to evolve as users acquire more and more cloud services. Hence the framework captures a 'snapshot' of the user requirements via the RFS and imitates the service discovery process to acquire services that match that snapshot. If the user is not satisfied with the services discovered, they can change their requirements (say, by increasing the cost constraint) and/or policies and re-start the discovery phase with a new RFS. It is also assumed that the user requirements will change once the user begins consuming the services and so we show a link between the consumption and requirements phase to indicate system triggers that could start a new cycle of service acquisition with a different requirements snapshot (new RFS).

Some of the policies and constraints that may be included in RFS are listed below. Additional policies/constraints that may be domain specific can be specified as needed.

1. Functional specifications list a. Service tasks to be provided b. Budgetary/Cost policies and constraints c. Service Domain
2. Technical specifications a. Service's Software applications b. Software compatibility constraints c. Hardware Policy—e.g. Mobile device, PC, Server, Multicore etc. d. Operating System Policy—e.g. single OS support, multiple OS support e. Language Support Policy f Cloud Deployment—Private, Public, Hybrid, Community g. Cloud Service Layer—IaaS, PaaS, SaaS
3. Human Agent policy a. Agent experience in years b. Agent skill level c. Agent's location constraints d. Nationality/Work permit constraints
4. Security Policy a. Roles and Permissions b. Cloud/Service Provider Location constraints c. Data Encryption, Deletion constraints d. Virtualization—Virtual Machine separation e. Multi-tenancy policies
5. Data Quality Policy a. Low quality data may be acceptable to consumer if it provides cost saving
6. Service Compliance Policy a. Standards adhered; b. Certifications needed; c. Government regulations adhered.

While ontologies have been developed for generic processes, domain specific technical specifications will require their own ontologies. For example, for the computing service, the ontology will define the semantics of each computing term like processor speed, processor memory, number of cores, etc. Cloud vendors may bundle their service offerings in any combination and give it brand names like 'compute unit'; however the technical specifications will specify each attribute desired and so will make it possible to query across disparate services offering similar service with different attributes bundled together. This is part of the W3C standardized semantic web approach.

Figure 2:
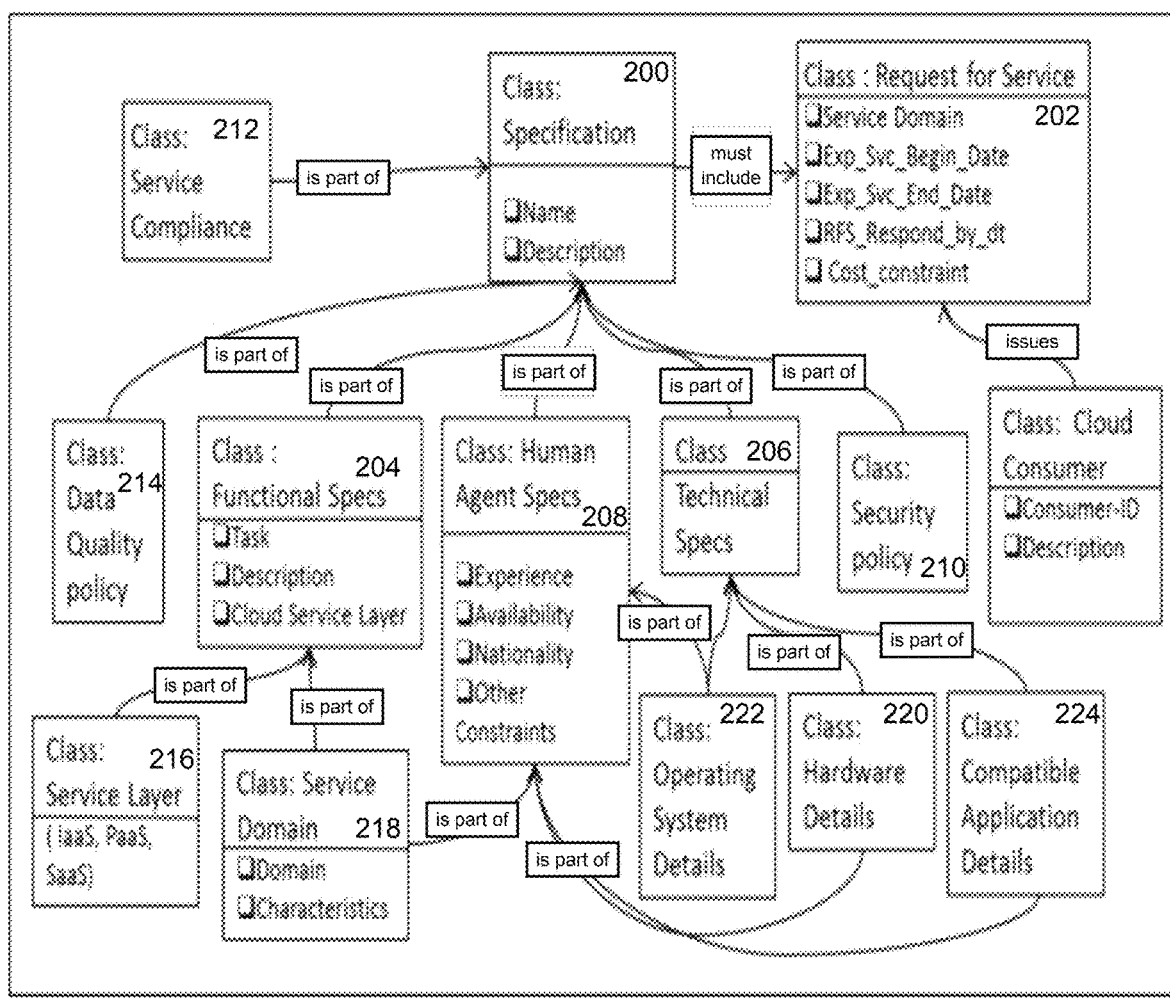
FIG. 2 is a graphic and shows an example of a high level ontology of a service requirements phase that contains the RFS class that includes a Specification class.

FIG. 2 illustrates the high level ontology for this phase. The two main classes are the Specification class 200 and the "Request For Service" class 202. The Specification class consists of six main classes that define the functional specifications 204, technical specifications 206, Human agent specifications 208, security policies 210, service compliance policies 212 and data quality policies 214. The functional specifications include the tasks to be automated by the service, the cloud service layer 216 and the service domain 218. The three cloud service layers that have been identified by NIST [19] are Infrastructure as a Service (IaaS), Platform as a Service (PaaS) and Software as a Service (SaaS). The functional specifications also include the budgetary policies and cost (the price that the consumer is ready to pay for the service) constraints associated with the service. The technical specifications contain information about the Hardware 220, Operating System 222 and other compatible services/applications 224 that the desired service should con form to. Human Agent specifications also list the technical and domain expertise that the service providing agent should have. The security constraints specified in the RFS include policies regarding service role/permission levels, data security policies and cloud location/ownership policies.

It is contemplated as within the scope of the invention to use existing ontologies that have been developed for classes like standard hardware, operating systems and computer applications. Semantic Web policy language, like AIR, can be used to describe service specifications and constraints in machine-processable format.

Most large organizations already have clearly defined policies for acquiring services. In addition, the policies that have to be specified in the RFS already exist as institutional or enterprise policies. These enterprise policies are centrally managed by the organization's head and may be electronically maintained across various organizational functions like Legal, Human Resources, Procurement, IT and Telecommunications, Facilities and Security. It will be a one-time effort for the organization to consolidate these policies into a single machine readable format to create organization's service policy document or system. The service policy document can then be invoked each time a new RFS has to be issued thereby automating the RFS process. This will significantly reduce the amount of time needed for the Service Requirements phase and also significantly reduce if not completely eliminate policy oversight while acquiring a service.

Service Discovery Phase

In the Service Discovery phase, providers are discovered by comparing the specifications listed in the RFS with service descriptions. The discovery is constrained by functional and technical attributes defined, and also by the budgetary, security, compliance, data quality and agent policies of the consumer. An organization can release the RFS to a limited pre-approved set of providers. Alternatively, it can search for all possible vendors on the Internet. While searching the provider, service search engines or cloud brokers can be employed. A 'Cloud Broker' role has been identified in the NIST reference architecture which is used in our ontology. This cloud broker runs a query against the services registered with a central registry or governing body and matches the service layer, domain, data type, compliance needs, functional and technical specifications and returns the result with the service providers matching the maximum number of requirements listed at the top.

One critical part of this phase is service certification, in which the consumers will contact a central registry, like UDDI, to get references for providers that they narrow down to. The NIST reference architecture has identified a Cloud Auditor role that will be primarily responsible for Security Audit, Performance Audit and Privacy Impact Audit of the cloud. This role is used in our ontology to be the 'provider certifying agent' that will be referenced in the Service Discovery Phase.

Figure 3:
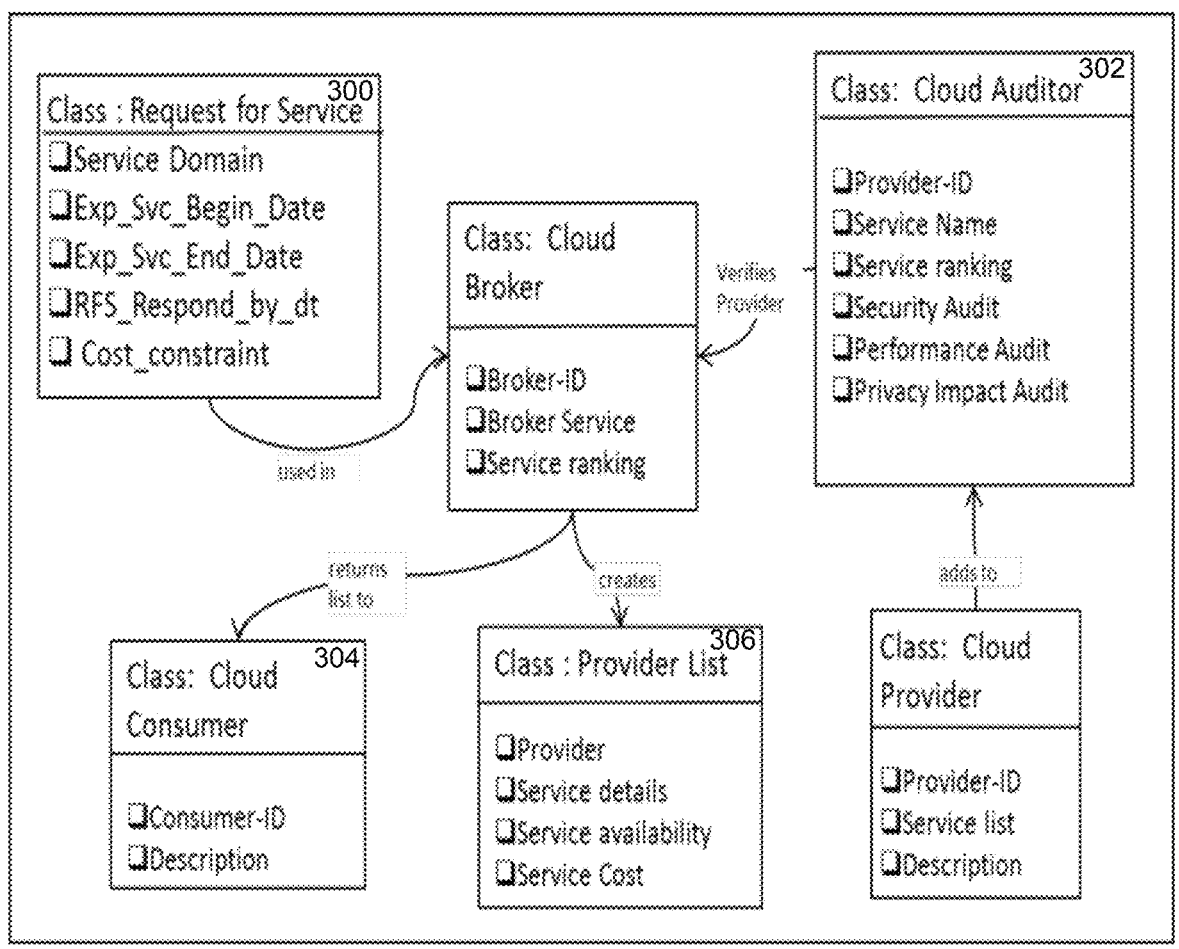
FIG. 3 is a graphic and shows an example of a high level ontology for the service discovery phase that uses the RFS class to search for providers and generate a provider list.

FIG. 3 illustrates the high level ontology for the service discovery phase, which uses the RFS class 300 from the requirements phase to search for service providers and generate a list of providers with which to begin negotiations. The Cloud Auditor 302 validates the provider's credentials and issues a service certification if the credentials are fine. The cloud consumer's policies will determine if the cloud provider certification is essential or it can be skipped. Large organizations with stricter security policies can mandate that a provider is added to the provider's list only after the certification is received.

If the cloud consumers find the exact service within their budgets, they can begin consuming the service immediately upon payment. However, often the consumers will get a list of providers who will need to compose a service to meet the consumer's specifications. The cloud consumer will have to begin negotiation with the service providers which is the next phase of the lifecycle. Each search result will return the primary provider who will be negotiating with the consumer.

Additionally, in order to be able to take advantage of virtualized service models, it is imperative for the consumer to be able to identify all the constraints or assertions of a service that need to be met along with its functional requirements. Cloud Service constraints can typically be classified as hard and soft constraints. Hard constraints are non-negotiable and have to be met by service providers. Soft constraints help to define the desired service attributes on which the consumer is willing to negotiate. Often, the same service attribute will have both a hard and a soft constraint (for instance, a desired software version vs. the minimum version needed for the task, a desired amount of memory vs. the minimum needed for the task etc.). FIG. 4 illustrates how a consumer can specify the hard 402 and soft 404 constraints for a cloud service. As another example, consider a consumer who wishes to procure a computing service to perform CPU intensive tasks. Policies would be specified as:

Hard Requirements:
   SINGLE PROCESSOR, SPEED AT LEAST 1 MHZ;
     MINIMUM STORAGE NEEDED: 100 GB;
   COST: AT MOST $2/HR Soft Requirements:
   SINGLE PROCESSOR SPEED 2 MHZ: STORAGE
     NEEDED: 500 GB; COST $1/HR The consumer's requirements policy (as captured by the RFS) would specify the soft constraints. When the provider's service policy manager reviews the requirements and finds that it can't meet them, it will try and negotiate. The consumer's response to the counterproposals meeting its hard requirements would be guided by the policy which ranks the constraints. For instance, the policy might ask it to prefer a speedier processor over more disk storage, or to accept disk storage as close to the minimum needed as possible to keep the cost low. The consumer would relax the soft constraints by relaxing it to the next higher or lower value. While for numeric constraints it is easy to specify the higher and lower values, for non-numeric constraints (for instance Encryption Type), we will have to define the higher and lower value in the service ontology.

We have incorporated the service constraint type and relaxation type in the cloud services lifecycle ontology that we described in the previous chapter.

Figure 5:
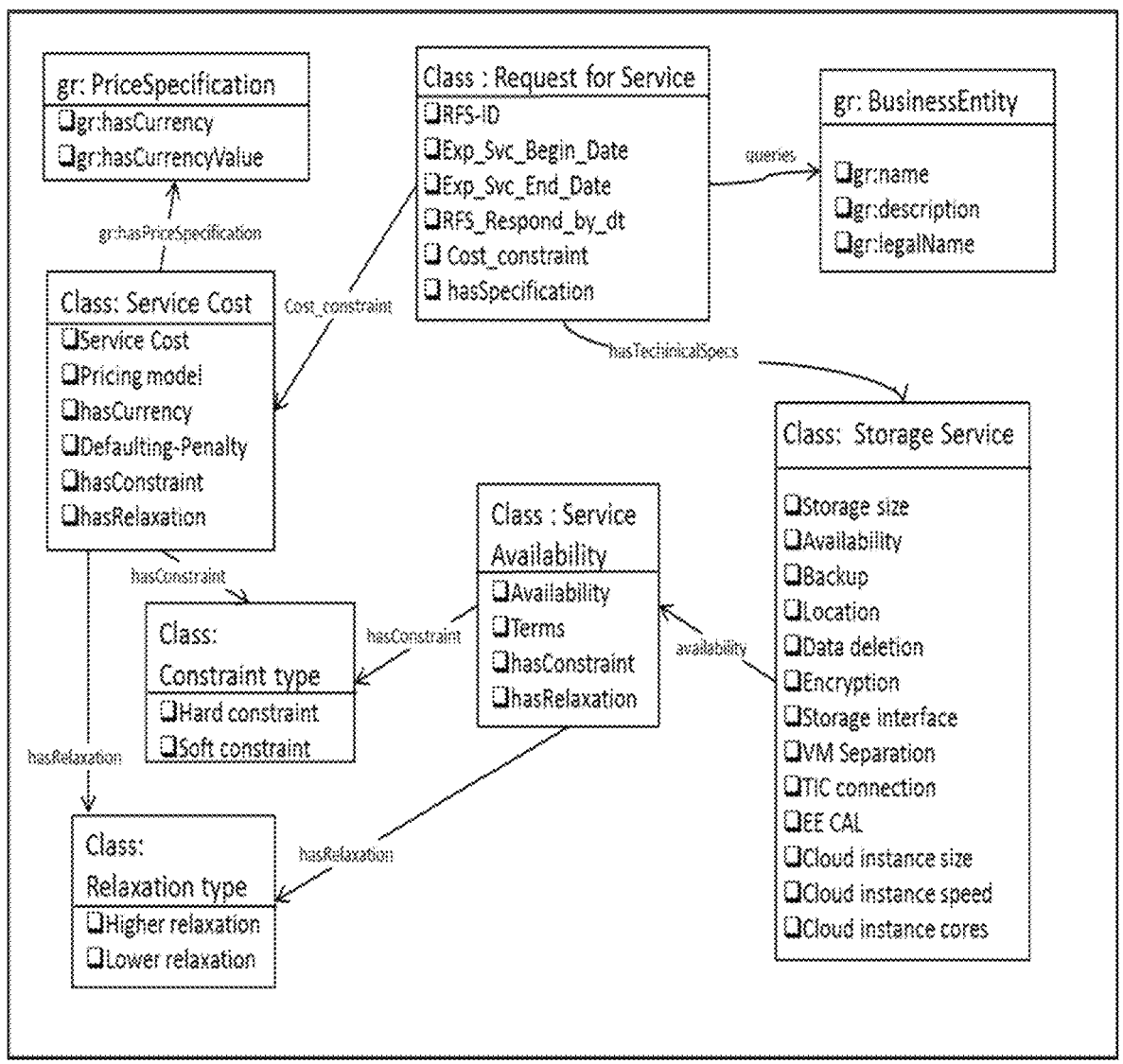
FIG. 5 illustrates the relaxation type and constraint type classes that have been added to the ontology to enable specification of hard/soft constraint with higher or lower relaxation.

FIG. 5 illustrates the relaxation type and constraint type classes that have been added to the ontology to enable specification of hard/soft constraint with higher or lower relaxation.

Referring now to FIG. 6, Negotiation for Cloud SLAs will also include agreement on service support metrics. Some key support metrics that we were able to compile after discussions with a large financial organization include—Availability timeframe of services, Scheduled maintenance times, Contingency or business continuity plans, Timeframes for notification and recovery following an unplanned service disruption or a security incident, and Problem resolution and escalation procedures, etc.

We have incorporated these support metrics in the SLA ontology. FIG. 6 illustrates a small section of the ontology that specifies the desired support metrics.

Service Negotiation Phase

The service negotiation phase covers the discussion and agreement that the service provider and consumer have regarding the service delivered and its acceptance criteria. In our discussion with our collaborators we found that the negotiation of SLA for the cloud services procured is the most time consuming portion of the cloud service procurement process.

Automation of this process using SPARQL queries is itself a performance improvement over the existing human-based negotiation. The service to be delivered is determined by the specifications laid down in the RFS. Service acceptance is usually guided by the Service Level Agreements (SLA) that the service provider and consumer agree upon. SLAs define the service data, delivery mode, agent details, quality metrics and cost of the service. While negotiating the service levels with potential service providers, consumers can explicitly specify service quality constraints (data quality, cost, security, response time, etc.) that they require.

At times, the service provider will need to combine a set of services or compose a service from various components delivered by distinct service providers in order to meet the consumer's requirements. The negotiation phase also includes the discussions that the main service provider has with the other component providers. When the services are provided by multiple providers (composite service), the primary provider interfacing with the consumer is responsible for composition of the service. The primary provider will also have to negotiate the Quality of Service (QoS) with the secondary service providers to ensure that SLA metrics are met. The negotiation steps are listed below and shown in the negotiation sequence diagram in FIG. 7.

Negotiation Protocol

Negotiation protocol is defined as a set of rules that govern interaction between negotiation parties. It defines the types of participants, negotiation states, events that cause states to change and valid actions of the participants. We have developed a protocol to automate the negotiation that takes place between the cloud consumer 702 and cloud provider 704, when acquiring services from the cloud. This negotiation protocol is used to describe the mechanism and rules that negotiating parties (i.e., cloud consumer and cloud consumer) should follow. There are three states of negotiation—Accept, Reject and Relax. In the Relax state, the soft constraints specified by the consumer are relaxed higher or lower as specified by consumer's cloud policy. The constraints are relaxed till hard constraint values are reached. If there are multiple constraints that have to be met by the service provider, then the constraints have to be prioritized before generating the RFS 706. The constraints with lower priority are relaxed first in the negotiation protocol followed by the constraints with higher priority.

Figure 7:
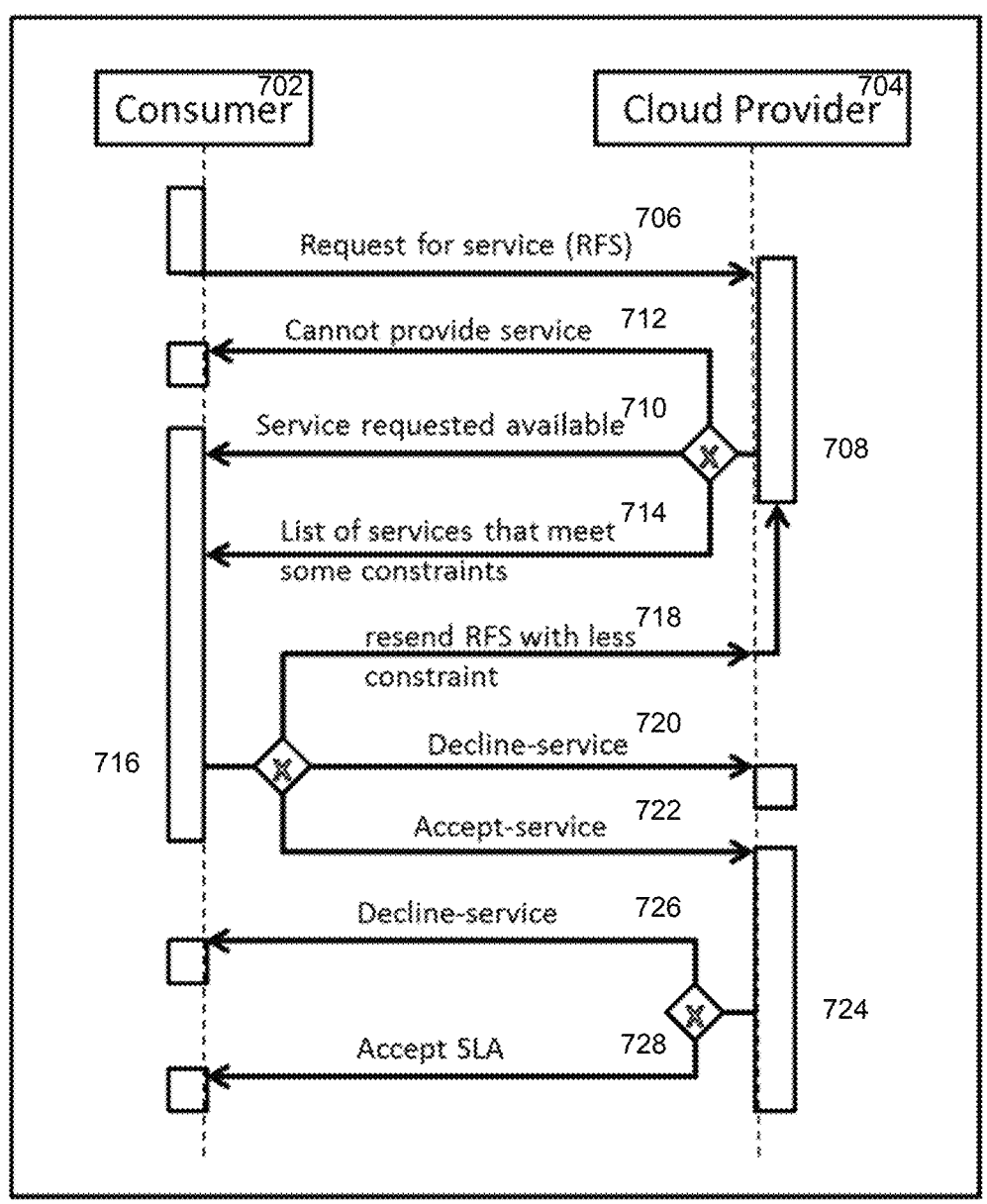
FIG. 7 is a diagram and shows an example of a sequence of steps in a direct service negotiation sequence.

FIG. 7 illustrates the negotiation protocol. The events that cause a change of state to are explained below.

Event 1: The consumer sends a Request for Service (RFS) 706 to the provider specifying the soft constraints for the functional and non-functional requirements.

Event 2: The provider responds to the RFS in one of three ways 708

ACCEPT 710: Indicates that a service matching all the requirements exists and sends the quote with SLAs.

REJECT 712: Informs the consumer that it cannot provide the service, terminating negotiation.

RELAX 714: Indicates that there is a partial match of requirements and sends the quote with SLA file listing matching constraints.

Event 3: The consumer receives the quote and determines if any hard constraints have not been met.

Event 4: The consumer responds to the quote in one of three ways 716

RELAX 718: If the quote is a partial match and constraints can be relaxed, the consumer relaxes the constraints not met, and resends the RFS to the provider. Constraint relaxation is based on the identified hard and soft constraints. The provider repeats the actions in step 2.

ACCEPT 722: If the response is a full match and the consumer is satisfied with the offer then negotiation is regarded complete. The consumer accepts this offer and returns it as an SLA.

REJECT 720: If the quote is a partial match and hard constraints not met, the consumer declines the service: terminating the negotiation. Consumer can also send a reject response if they have found another provider or no longer needs the service.

Event 5: The provider responds to the RFS in one of two ways 724

REJECT 726: The provider can no longer provide the service, and rejects the agreement, terminating negotiation.

ACCEPT 728: The provider agrees with the constraints, and the same RDF file consisting of the SLA now exists with both parties.

The SLA generated will be an instance of the OWL ontology that we have developed for capturing all the metrics of the cloud service. Appendix 2 lists this ontology in OWL DL language (XML notation).

Figure 8:
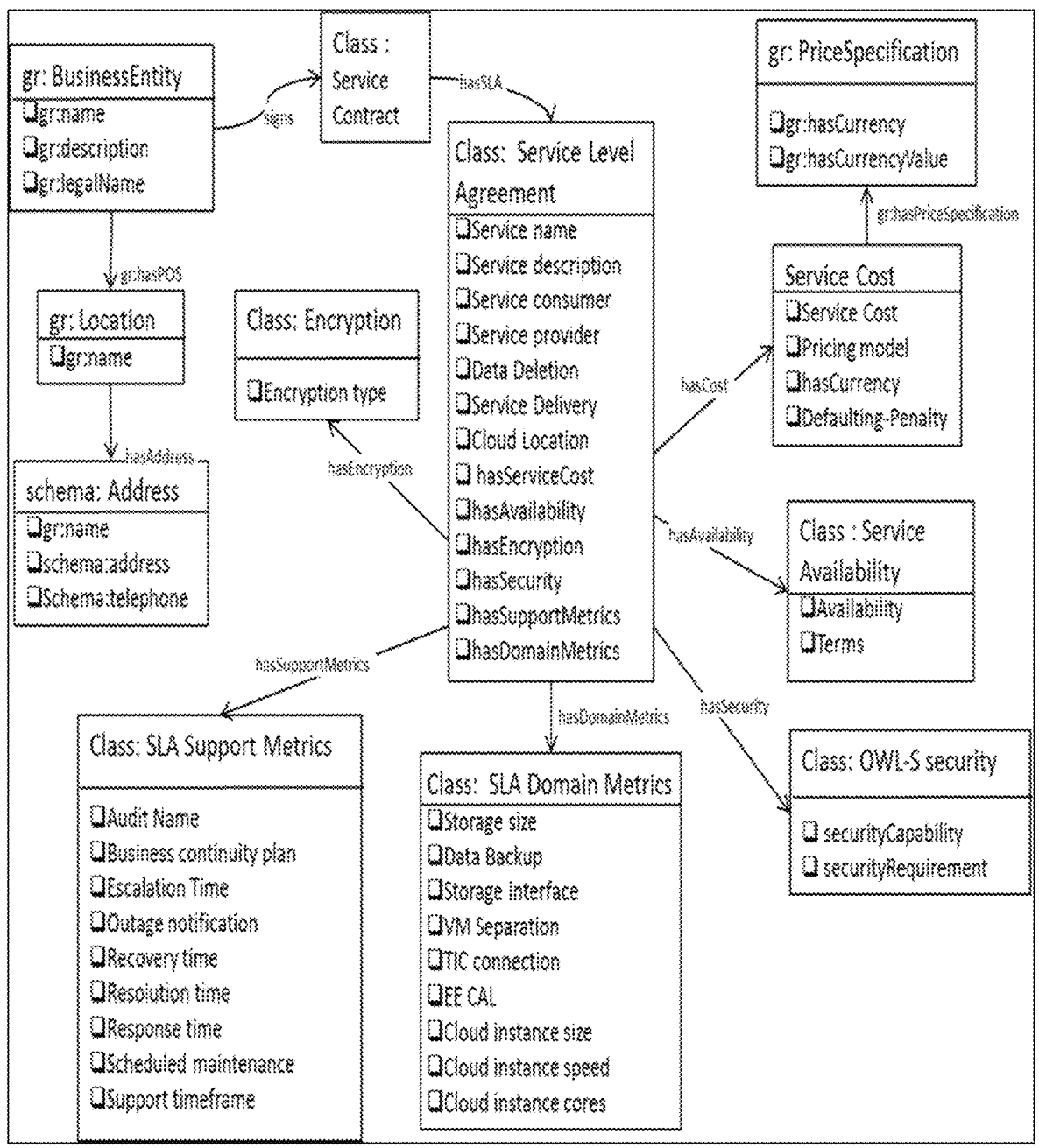
FIG. 8 is a graphic showing an example of an ontology for Cloud Service Level Agreement (SLA).

FIG. 8 illustrates the Cloud SLA ontology.

Alternate Description of Steps for Service Negotiation on the Cloud

1. The consumer sends a RFS to the provider specifying the functional and non-functional requirements.
2. The provider responds to the RFS in one of three ways
   a) Informs the consumer that it cannot provide the service, terminating negotiation, b) Indicates that a service matching all the requirements exists and sends the quote with SLAs, c) Indicates that there is a partial match of requirements and sends the quote with SLA file listing matching constraints.
3. The consumer receives and considers the quote
4. The consumer responds to the quote in one of three ways a) If the quote is a partial match, the consumer relaxes the service constraints and/or functionality and resends the RFS to the provider. The provider repeats the actions in step 2. b) If the response is a full match and the consumer is satisfied with the offer then negotiation is regarded complete. The consumer signs this offer and returns it as an SLA. c) The consumer can decline the service, terminating the negotiation.
5. The provider responds to the RFS in one of two ways
   a) The provider can no longer provide the service, and rejects the agreement, terminating negotiation. b) The provider agrees with the constraints, and the same RDF file consisting of the SLA now exists with both parties.

Figure 9:
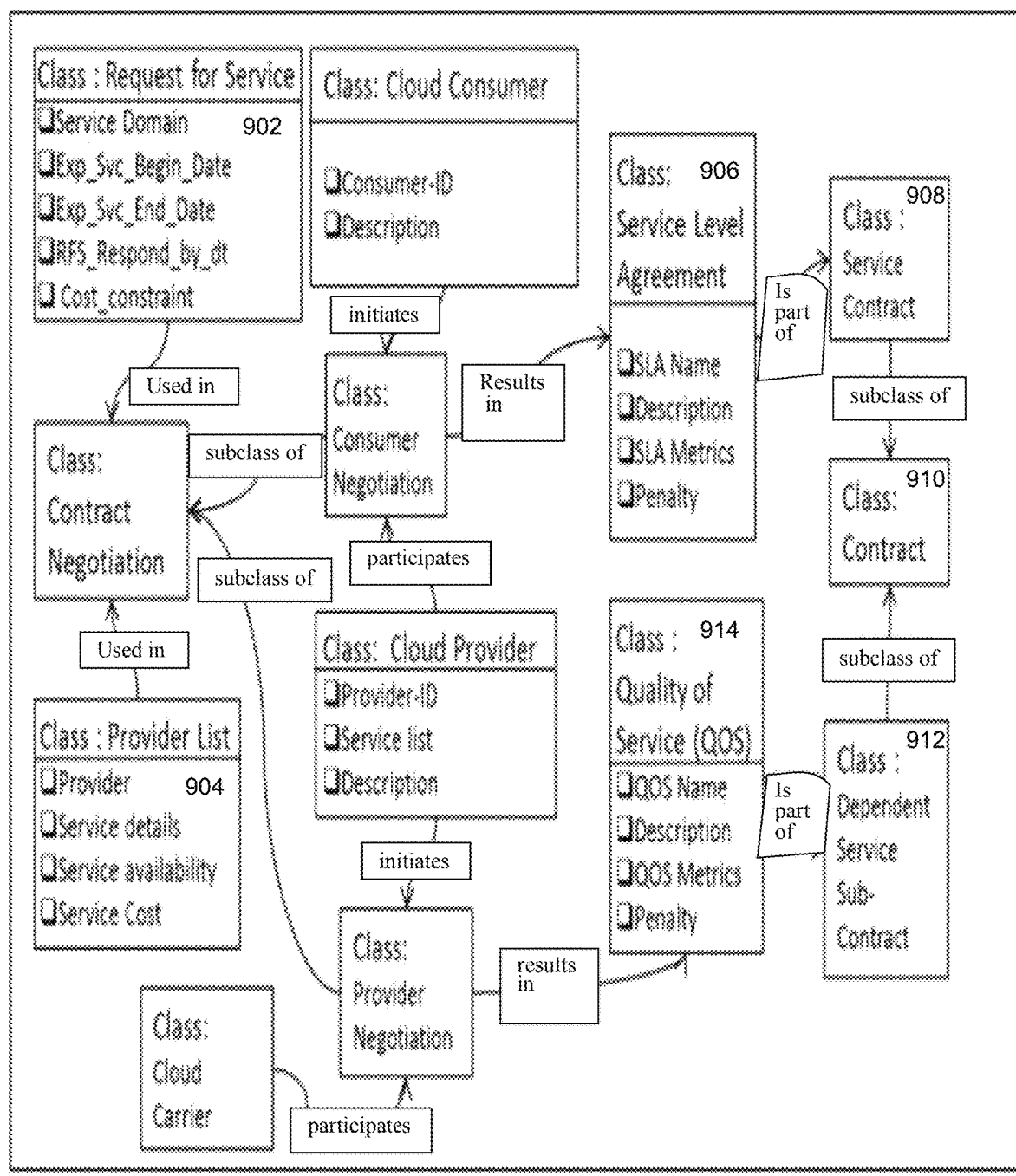
FIG. 9 is a graphic showing an example of a high level ontology for service negotiation that uses the RFS class for the contact negotiation and creation of the SLA and QoS.

Referring now to FIG. 9, a high level ontology has been constructed for this phase and it is illustrated in FIG. 9. This phase uses the RFS class 902 from the requirements phase and the provider's list class 904 from the discovery phase to negotiate the contracts between consumer and primary provider and between the various component providers themselves. The key deliverable of this phase is the service contract between the service consumer and service provider. The SLA 906 is a key part of this service contract and will be used in the subsequent phases to compose and monitor the service. Another deliverable of this phase are the service sub contracts 908, 910, 912 between the service provider and component (or dependent services) providers. The QoS 914 are the essential part of the service sub-contracts and are used in the consumption phase to monitor service performance.

Service Composition Phase

In this phase one or more components provided by one or more providers are combined and delivered as a single service to the service consumer. Service orchestration determines the sequence of the service components.

Figure 10:
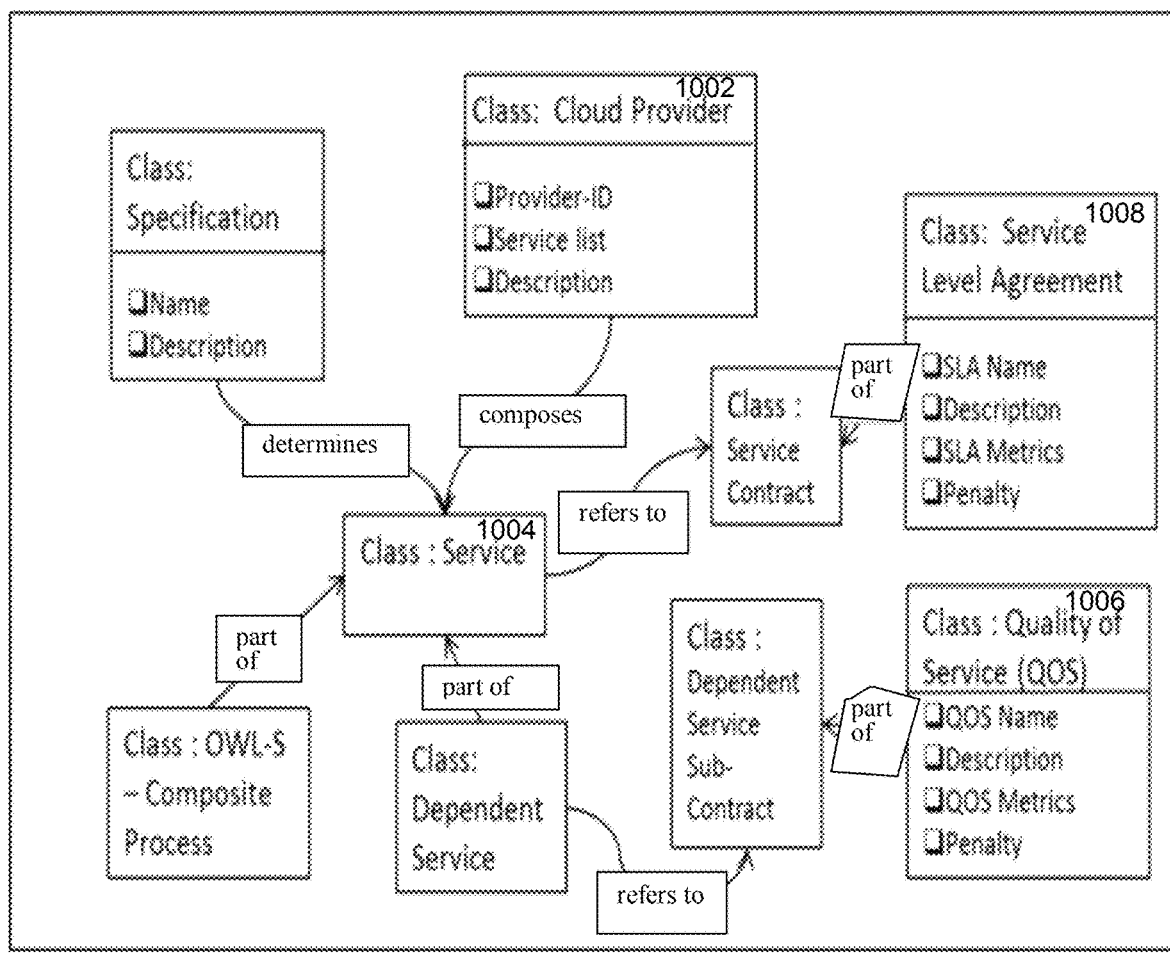
FIG. 10 is a graphic showing an example of where the ontology for composition phase builds on the OWL-S composite process class.

FIG. 10 illustrates the high level ontology for this phase. The main class of this phase is the Service class that combines the various components into a single service. We include the OWL-S Composite Process class ontology. The Service class takes inputs from the Specification, Service Contracts and Service Level Agreement classes defined in the earlier phases to determine the orchestration of the various components.

Service Consumption/Monitoring Phase

The service 1004 is delivered to the consumer based on the delivery mode (synchronous/asynchronous, real-time, batch mode etc.) agreed upon in the negotiation phase. After the service is delivered to the consumer, payment is made for the same based on the pricing model agreed to in the SLA. The consumer then begins consuming the service 1004. In a cloud environment, the service usually resides on remote machines managed by the service providers 1002. Hence the onus for administrating, managing and monitoring the service lies with the provider 1002. In this phase, consumer will require tools that enable service quality monitoring 1006 and service termination if needed. This will involve alerts to humans or automatic termination based on policies defined using the quality related ontologies. The Service Monitor measures the service quality and compares it with the quality levels defined in the SLA 1008. This phase spans both the consumer and cloud areas as performance monitoring is a joint responsibility. If the consumer is not satisfied with the service quality, s/he should have the option to terminate the service and stop service payment.

Figure 11:
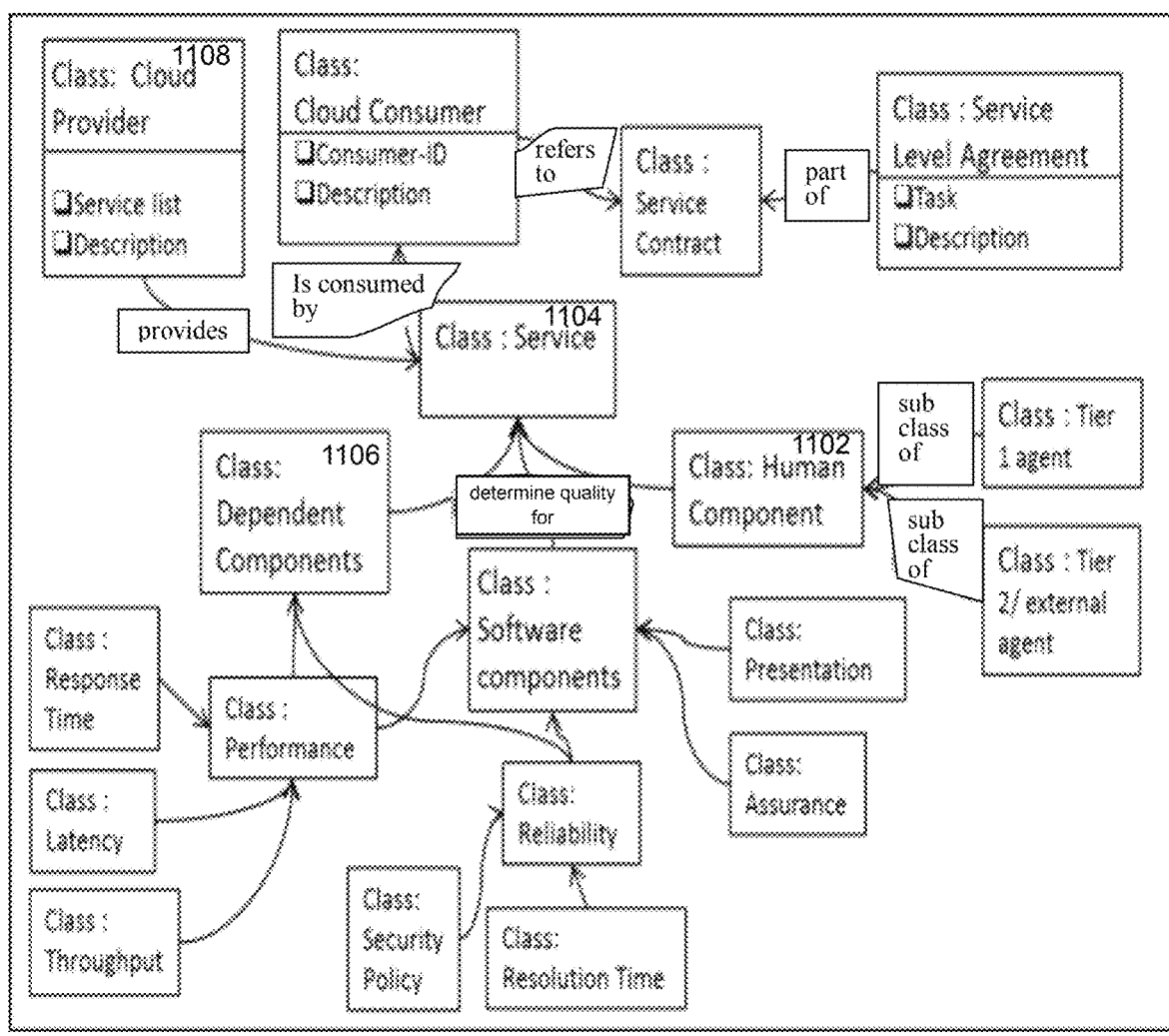
FIG. 11 is a graphic showing an example of where the ontology for consumption phase contains classes to monitor the quality of software, human and dependent components of the composite process.

FIG. 11 illustrates the ontology for this phase. The composite service is composed of human agents 1102 providing the service, the service software 1104 and dependent service components 1106. All the three elements, agents, software and dependent services, must be monitored to manage the overall service quality. The providers 1108 have to track the service performance, reliability, assurance and presentation as it will influence customer's satisfaction rating (CSATs). Since the dependent services/components will be at the backend and will not interface directly with the consumers, the service provider 1108 only needs to monitor their performance. A framework is hereby provided to manage quality based on fuzzy-logic for such composed services delivered on the cloud.

Cloud Storage Service Prototype

In this section the prototype is described that has been constructed as a proof of concept for the proposed lifecycle and ontology. This prototype is based on the actual use-case identified by NIST's cloud computing initiative. It demonstrates the capability that cloud users will have in the future to automatically acquire IT services from the cloud. There are many cloud providers, like Amazon or Dropbox, that provide cloud storage services. However, to show end-end operation of the system (from policy specification to service acquisition), the prototype was developed on an open source cloud platform (*Eucalyptus*). This demonstrated, for example, that the cloud provider could satisfy the user request for Virtual Machine (VM) separation, which was a key requirement for NIST. The framework is fully capable of describing such constraints, which was demonstrated by using real constraints that represent federal agency requirements that were obtained from NIST. Although it is contemplated as within the scope of the inventive, since there is no way to invoke such mechanisms on closed clouds such as Amazon or Dropbox, the demonstration prototype was built on an open source platform.

Service Description

For the prototype, a simple Storage service was considered as a representative scenario for Infrastructure as a Service (IaaS), whereby users can store their files/data on the cloud. It consists of a web interface that enables cloud users to easily define the service policies and constraints by choosing predefined values from dropdown fields. The tool then discovers the services that will match the specified policies. A Cloud-provider end server process interprets the policies specified by the user(s) and establishes SLAs by the process of negotiation.

The invention has incorporated actual enterprise policies related to data storage and security that are practiced by large organizations. The invention uses the policies defined in the use case identified by the NIST cloud computing initiative. While requesting the storage service, users will specify the following service attributes depending on their storage needs.

6. Storage size needed (in GB/TB units)
7. Service Cost (The price consumers are willing to pay for the service)
8. Data Preservation/Backup requirements (Hot backup—Yes/No; daily/weekly)
9. Service availability (e.g. 99%, 99.9% etc.)
10. Data Location (restricted to a geo-location or can be anywhere in the world)
11. Data deletion policy (data deleted or merely made inaccessible, secure wipe or not)
12. Data Encryption policy (data stored encrypted or not; encryption algorithm used, key strength)
13. Compliance policy—compliance or noncompliance for a Trusted Internet Connection (TIC) specification, CC Evaluation Assurance Level (EAL) levels
14. User authentication mechanism (FIPS 140-2 supported?)
15. Virtual Machine (VM) separation (supported or not)
16. Size, speed and number of cores for an instance specification,
17. SOAP or REST interface for a storage specification.

In addition to the NIST policies, the invention in another embodiment can also refer to service procurement policies of a large international financial organization. The main goal of this organization's service procurement policy is to acquire the "best value" service that will have an optimal combination of technical factors (like quality, functionality, service, innovation, environmental sustainability) and financial factors (like purchase price, total cost of ownership etc.) that meet the organization's needs. To acquire the "best value" service in a transparent fashion, the organization's policies mandate that any purchases above US$25,000 have to be done via a competitive procurement process that considers multiple competing proposals from qualified suppliers, and makes an award decision based on the merits of each proposal, relative to some predetermined criteria for best value. Exceptions are made if the service product is sold by only one vendor (sole-sourced) thereby rending the competitive bid a moot point. To continue receiving 'best value' service, the service contract by policy is limited to three years and then competitively re-bid at the end of the third year. Every service provider is expected to sign a Service Level Agreement (SLA) as part of the service contract. The essential elements of the SLA include the availability timeframe of service, contingency plans, timeframes for notification and recovery following an unplanned service disruption or a security incident, problem resolution and escalation procedures, and scheduled maintenance times. The invention has used these elements when developing the SLAs during the negotiation phase.

Prototype Platform

In this example, the invention used Semantic Web technologies to build the front end of the prototype as they are platform independent and inter-operable. The invention used SPARQL, Jena Semantic Web framework and the Joseki software, which is a HTTP engine that supports the SPARQL Protocol and the SPARQL RDF Query language, to develop the prototype. After defining our service, a SPARQL was created as endpoint using Joseki to simulate a service provider providing the service. Since the Joseki server allows multiple service definitions, it was used to simulate both multiple services provided by the provider as well as multiple instances of a same service. The Joseki service database contained the service description along with the provider policies endpoint. For the cloud-end processes, the *Eucalyptus* Cloud was used which is an open source cloud platform. In addition to these two ontologies, the invention also contemplates another OWL ontology to describe the technical and security policies for the prototype.

Figure 12:
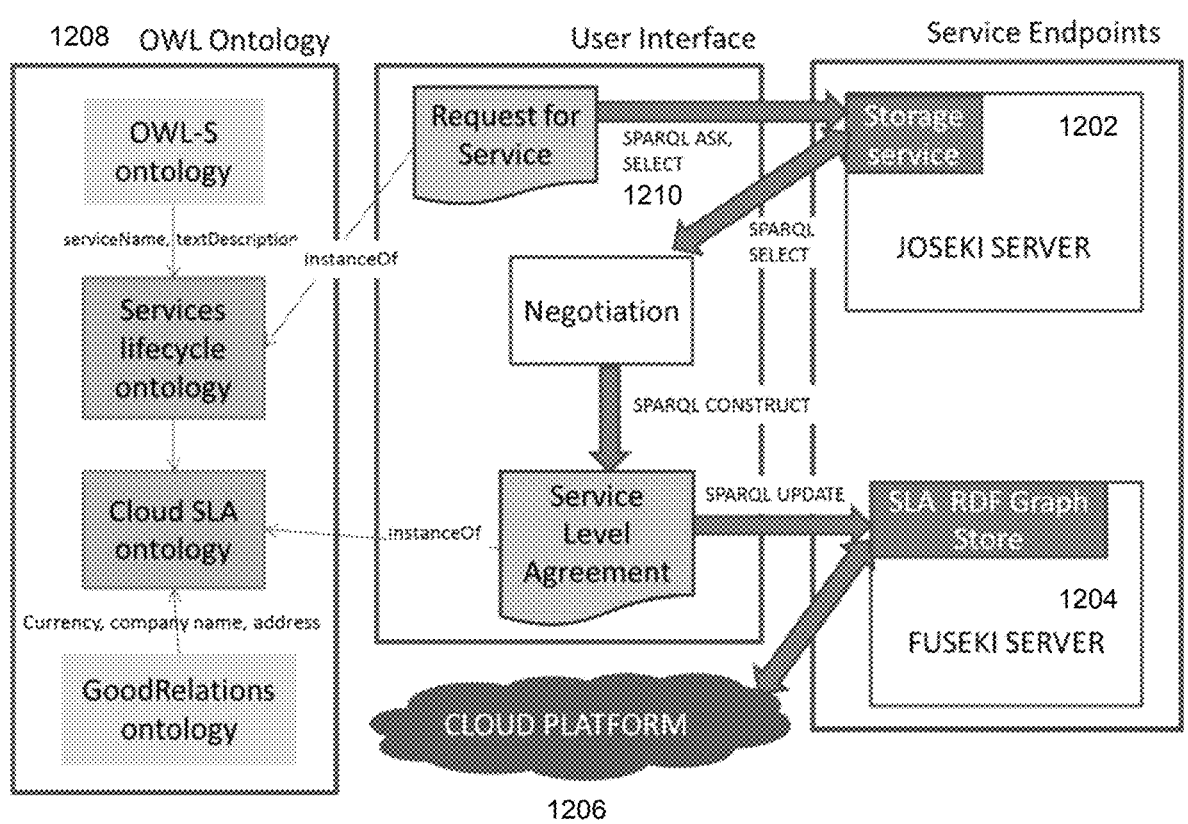
FIG. 12 is a graph and shows an architecture of a cloud service prototype.

In a first prototype, we used Semantic Web technologies like OWL 1208, RDF and SPARQL 1210 to develop the prototype. FIG. 12 illustrates the architecture of this prototype. It shows the ontologies that we used for our prototype. We used Joseki server 1202 to simulate a service endpoint which contains a list of cloud storage service options offered by the provider. We used the Fuseki server graph store 1204 to simulate a database or store of all SLAs which will exist both at the consumer and provider site. We interfaced this prototype with a *Eucalyptus* cloud platform 1206 installed in our lab.

Process Flow

Figure 13:
FIG. 13 is a screen shot of an example of a prototype graphical user interface where a Request for Service is generated.
Figure 14:
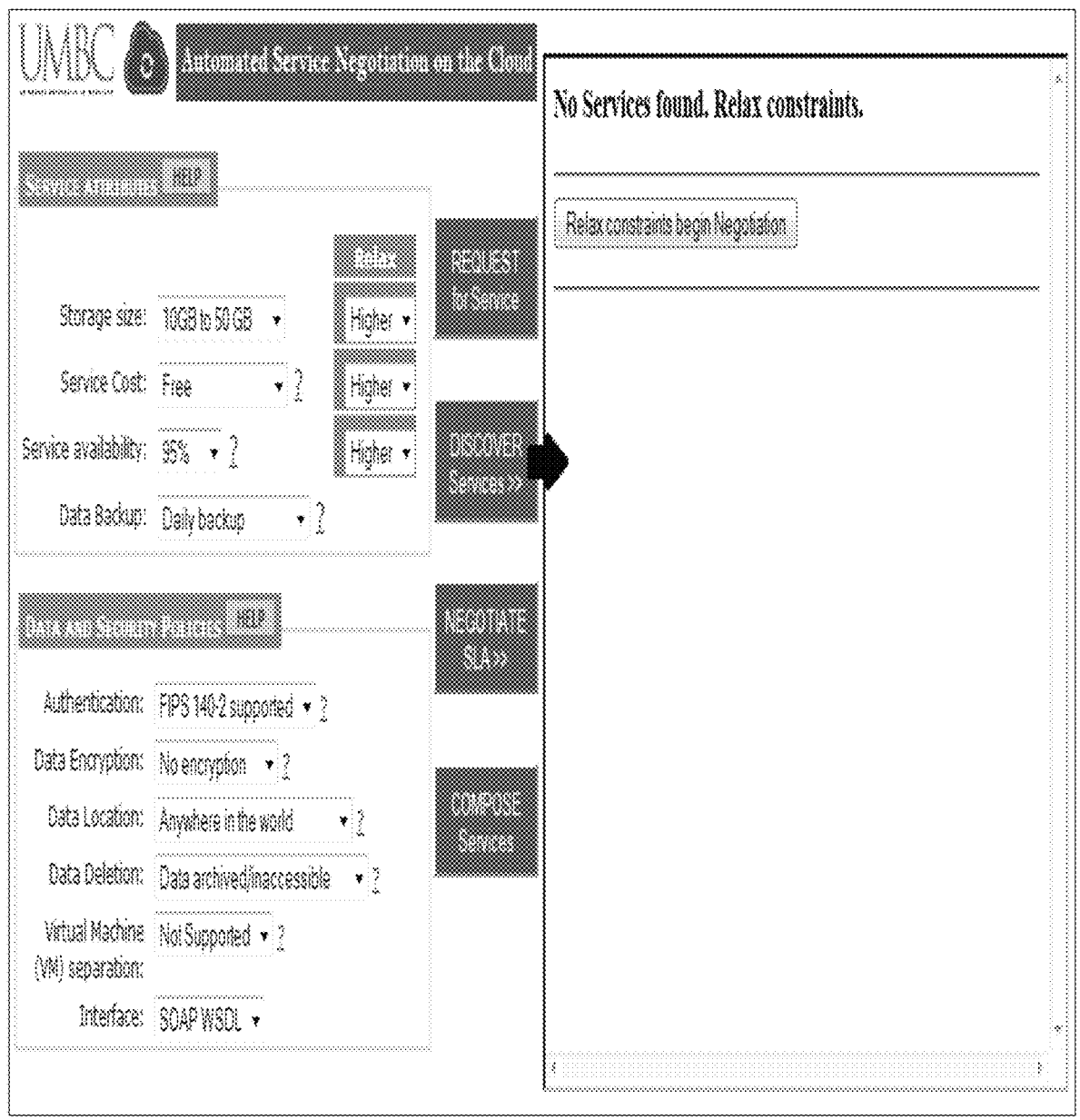
FIG. 14 is a screen shot of an example of a prototype graphical user interface where a Service is discovered for the constraints specified.

Referring now to FIG. 13, the prototype is based on the service lifecycle and flows through the live phases identified. In the requirements phase, users select the service attribute values from a drop down list. Once they have defined their requirements, they click the "Request for Service" button to generate a RDF document that contains the RFS (FIG. 13). In the discovery phase (illustrated in FIG. 14), the prototype queries all services by using SPARQL ASK and SPARQL SELECT commands to match the desired attributes. If an exact match is not found, as will be the case in most real-life situations, the prototype begins relaxing the service constraints one by one by removing the constraints from the SPARQL query and generating a new SPARQL query to search the endpoints.

Figure 15:
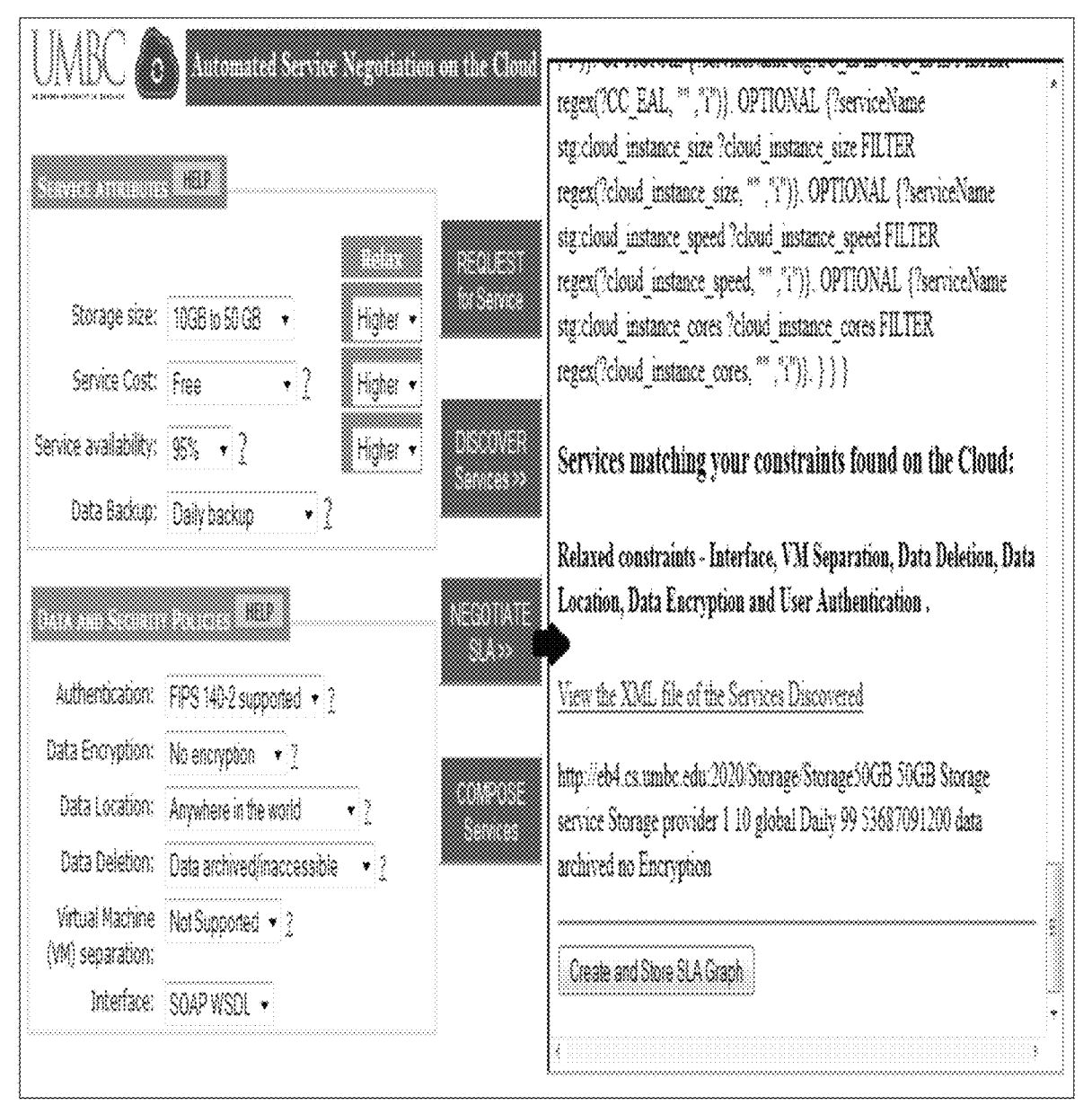
Figure 16:
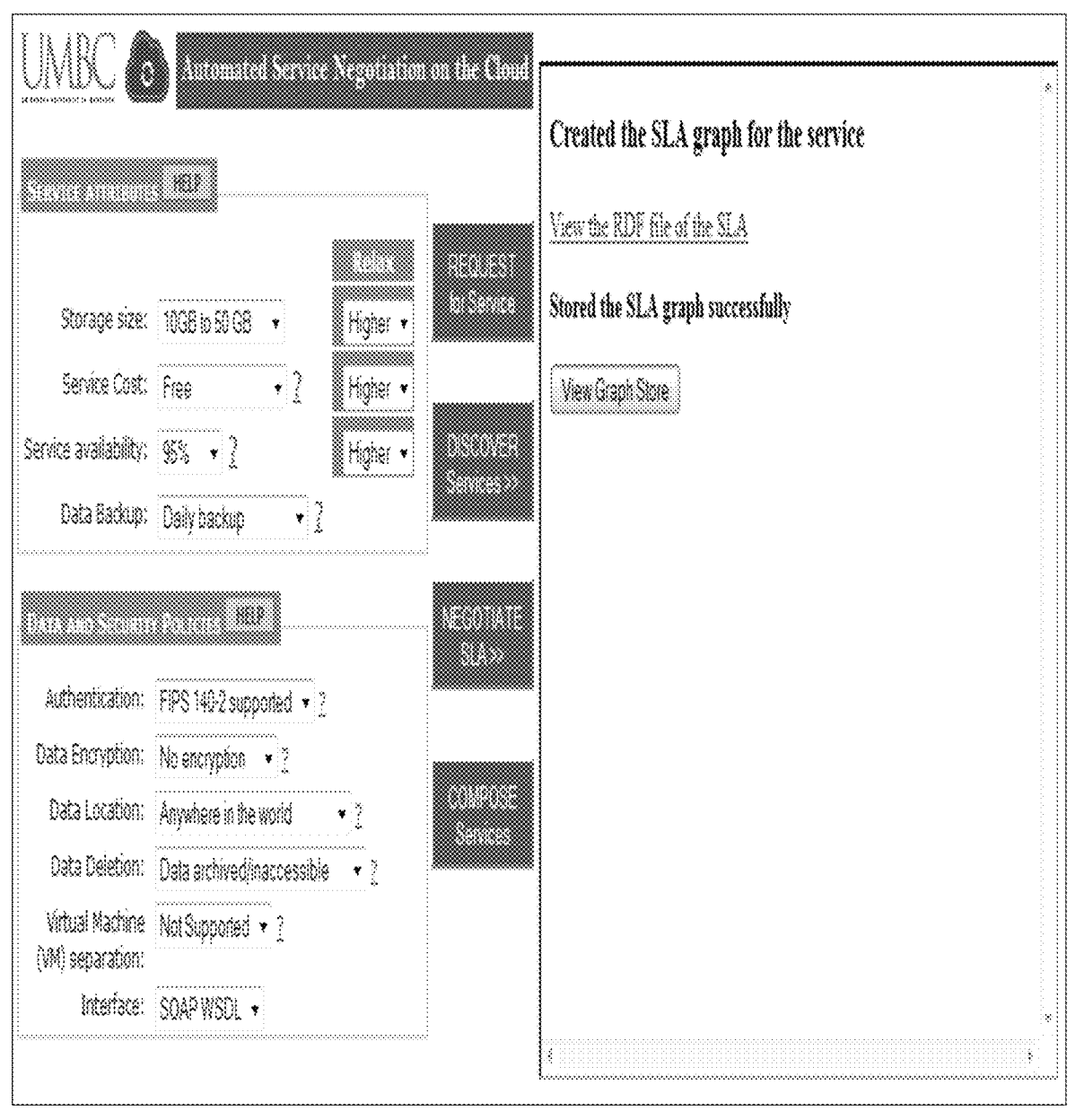
Figure 17:
FIG. 17 is a screen shot of an example of a prototype graphical user interface for discovering Cloud storage service by specifying constraints.

The constraints with the lowest priority are relaxed first. After each constraint relaxation, the prototype executes the new SPARQL query to discover services that match the new constraint set. When a service match is found, the prototype returns the service details of that service along with a list of constraints not met (illustrated in FIG. 15). The consumer can finalize the SLA by accepting the service that best matched the constraints. The final SLA is generated as a RDF file (FIG. 16) using SPARQL CONSTRUCT query and is in machine readable format. This SLA graph is stored in a Fuseki graph store and is referenced for composing the service in the *Eucalyptus* cloud. The SLA graph can also be used to monitor and track service performance. Referring now to FIG. 17, Service Requirements, in the requirements phase, the service layer was identified which is IaaS for our prototype, the service domain—in this instance storage service—and the functional and technical specifications. Functional specification describe in detail what functions/tasks should the service help automate. These are mandatory attributes that the service provider must provide. For our prototype, the service attributes are the storage size, backup rules, service availability and service costs. Specifications also list acceptable security levels, data quality and performance levels of the service software. Service compliance details like required certifications, standards to be adhered to etc. are also identified.

The prototype has a web-based user interface, illustrated in FIG. 17, which allows consumers to generate their RFS by using drop down lists. The interface logically separates the various components of the RFS into four sections—the mandatory service attributes include constraints that have to be met; the data and security policies, compliance policies and cloud instance.

Each field has an associate 'Help' description to help users determine which option to select. After selecting the values of their service attributes, security policies and compliance policies, the consumers can press the 'Request for Service' button to generate a RDF document that contains the RFS. FIG. 18 illustrates the RDF/XML document generated for the attributes selected in FIG. 17.

Service Discovery

Users can press the 'Discover Services' button to search for services that match the RFS issued. The tool generates federated SPARQL queries, like the one illustrated in FIG. 19, based on the selections on the screen. This query runs across multiple SPARQL endpoints to retrieve a list of matching services residing on that endpoint. If a query matching all the constraints is found, it is displayed on the screen. Else the user is advised to begin service negotiation by selecting the Negotiation button.

Service Negotiation

Users can press the 'Negotiate and Finalize SLA' button to begin the service negotiation. The tool automatically begins relaxing RFS constraints one by one by removing the constraints from the SPARQL query and generating a new SPARQL query to search the endpoints. The order of constraints relaxation for this prototype may be determined by, e.g. a NIST team that is collaborating with a user and who specified the priority of each constraint in the RFS. After each constraint relaxation, the tool executes a new SPARQL query to discover services that match the new constraint set. When a service match is found, the tool returns the service details of that service along with a list of constraints not met. The consumer can finalize the SLA by accepting the service that best matched the constraints. The final SLA is saved as a RDF file and is in machine readable format.

Service Composition and Consumption

The user tool is interfaced to the *Eucalyptus* Cloud which is an Infrastructure as a Service (IaaS) cloud solution. The tool and the *Eucalyptus* cloud were installed on separate machines. Due to security reasons, the *Eucalyptus* installation had no direct internet access and no direct access to the tool. The two systems communicated through an intermediate node called Bluegrit which is a 116 core PowerPC cluster managed at the University of Maryland Baltimore Campus (UMBC).

When the user clicks the Compose button, a Virtual Machine is created on the *Eucalyptus* cloud environment. The finalized SLA is referred to by an automated routine when launching the virtual machine. The URI of the service is then returned to the end user to begin consuming the service. By clicking on the Launch Service button, the consumer is directed to the service URI on *Eucalyptus* cloud environment.

Figure 20:
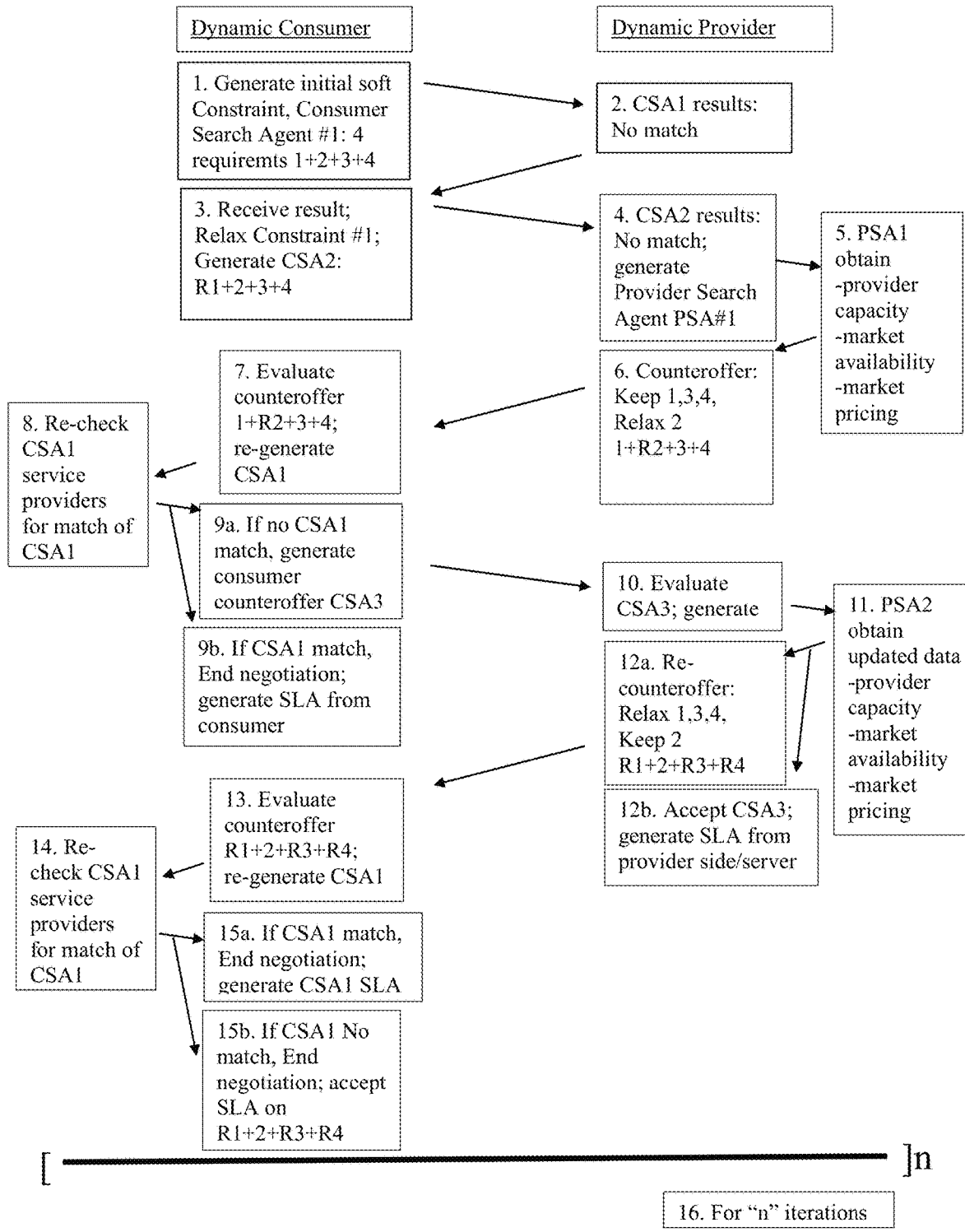
FIG. 20 is box and arrow graphic showing an embodiment where both the consumer and the provider are able to simultaneously and dynamically use consumer and provider cloud search agents as a true bilateral negotiation.

Referring now to FIG. 20, FIG. 20 is box and arrow graphic showing an embodiment where both the consumer and the provider are able to simultaneously and dynamically use consumer and provider cloud search agents as a true bilateral negotiation. FIG. 20 shows how each consumer and provider can dynamically re-check their negotiating position during various iterations by comparing to external values provided by re-running a previous search agent and/or by re-comparing against certain metrics, such as ability to perform, market availability of competitors, pricing changes, and so forth. Step 1 shows a consumer generating an initial soft constraint and using a generated search agent to search for providers which can provide service according to the constraints, in this example 4 constraints are exemplified. It is within the scope of the invention that the initial request can come as a provider-based offering. Step 2 shows that a result of "No matches" is returned, indicating that zero service providers are willing or able to satisfy the initial terms as described in Consumer Search Agent #1 (CSA1). FIG. 20, Step 3 shows how one constraint, R1, is relaxed and a new search agent, CSA2 is generated and sent to discover and identify service providers that can meet the new requirements. Step 4 shows how, again, the initial result is "no match", but in this case, the Service Provider uses a Provider Search Agent (PSA1) in Step 5 to obtain information on provider capacity, market availability of providers, and market pricing, and the Service Provider sets its own relaxed constraint, R2 at Step 6, and generates counteroffer CO #1 that allows a consumer to keep Constraint 1, 3, and 4 but only upon accepting relaxed Constraint R2. Step 7 shows how dynamic consumer receives and evaluates the counteroffer 1+R2+3+4, and prior to making a decision, generates and re-sends as shown in Step 8 the initial request, CSA1, to see if any service providers are willing to provide services for the unrelaxed terms 1+2+3+4 communicated in CSA1. Step 9a and Step 9b show the events for when there is again "no match" as in Step 9a, and where there is a newly found match, as in Step 9b. Step 9b shows that, if any provider accepts the initial terms, the negotiation is ended, a service level agreement (SLA) is generated and an acknowledgement (ACK) (not shown) is sent to the service provider that accepted the terms. Step 9a shows that where there is no match result from CSA1, that dynamic consumer can formulate counteroffer CSA3 where Constraints 1 and 3 are relaxed, R1 and R3, and Constraints 2 and 4, are maintained, yielding R1+2+R3+4.

Step 10 shows dynamic provider evaluates CSA3, then generates an updated provider search agent in Step 11, PSA2, to again check the current offer against external or internal metrics, e.g. capacity, availability, pricing, and so forth. Step 12a and Step 12b show the events for when there is again "no match" as in Step 12a, and where there is an acceptance of the proffered terms of CSA3, as in Step 12b. Step 12b shows that provider accepts the proffered CSA3 terms, the negotiation is ended, a service level agreement (SLA) is generated from the provider side and an acknowledgement (ACK) (not shown) is sent to the service consumer that the terms were accepted. Step 12a shows that where there is no match result from CSA3, that dynamic provider can formulate counteroffer CO #2 where Constraints 1, 3 and 4 are relaxed, R1. R3, R4 and Constraint 2 is maintained, yielding R1+2+R3+R4.

Step 13 shows how dynamic consumer receives and evaluates the counteroffer CO #2 R1+2+R3+R4, and prior to making a decision, generates and re-sends as shown in Step 14 the initial request, CSA1, to see if any service providers are yet willing to provide services for the unrelaxed terms 1+2+3+4 communicated in CSA1. Step 15a and Step 15b show the events for when there is a newly found "CSA1 match" as in Step 15a, and where there is an acceptance, as in Step 15b. Step 15a shows that, if any provider accepts the initial terms, the negotiation is ended, a service level agreement (SLA) is generated and an acknowledgement (ACK) (not shown) is sent to the service provider that accepted the terms. Step 15b shows that where there is no match result from CSA1, that dynamic consumer can, after "n" iterations, decide to accept CO #2, yielding R1+2+R3+R4.

It is important to again point out that, because of the way the invention is defined using an integrated ontology, that the entire negotiation is automated and machine-driven based upon pre-set metrics.

According to the examples and disclosure herein, the invention has defined an integrated ontology for processes needed to automate IT services lifecycle on the cloud and provides a holistic view of steps involved in deploying IT services. This approach complements previous work on ontologies for service descriptions in that it is focused on automating the processes needed to procure services on the cloud. The methodology can be referenced by organizations to determine what key deliverables they can expect at any stage of the process.

The tool that was built successfully demonstrates how the methodology can be used to significantly automate the acquisition and consumption of cloud based services thereby reducing the large time required by companies to discover and procure cloud based services. Also contemplated as within the scope of the invention is an embodiment of this tool for multiple users to scale up. Another embodiment, includes automating complex service negotiation process where the negotiation is on a range of values for a constraint. Another embodiment comprises an updated and refined ontology to capture these complex negotiation protocols. Additional embodiments include integrating this tool with other cloud computing platforms available in the industry today. One of the platforms that is consider is the Virtual Computing Lab (VCL) platform provided by IBM. Also contemplated as within the scope of the invention is an embodiment of this using Enterprise policies from various organizations for an expanded framework.

The invention may be used for the negotiation of multiple services. A non-exhaustive, non-limiting list of service is provided below:

TABLE 1

CLOUD SERVICES
Services Query.txt

| service_id | service_name | service_description | Domain_name |
|---|---|---|---|
| 1 | Backup and recovery | Platforms providing services to backup and recover file systems and raw data | IAAS |
| 2 | Big Data | Provides tools to automate and manage infrastructure used for Big Data | IAAS |
| 3 | Cloud Broker | Tools that manage services on more than one cloud infrastructure platform | IAAS |
| 4 | Compute | Provides resources for running cloud based systems that can be | IAAS |
| 5 | Content Delivery Networks | CDNs store content and files to improve the performance and cost of | IAAS |
| 6 | Health-wellness | Service for improving and managing health wellness related issues | IAAS |
| 7 | Services Management | Services that manage cloud infrastructure platforms. These tools often | IAAS |
| 8 | Storage | Provides massively scalable storage capacity which can be used for | IAAS |
| 9 | Business Intelligence | Platforms for the creation of business intelligence applications such as | PAAS |
| 10 | Database | These services offer scalable database systems that ranging from recreational | PAAS |
| 11 | Development & Testing | These platforms are only for the development and testing cycles of | PAAS |
| 12 | General Purpose | Platforms suited for general purpose application development. These | PAAS |
| 13 | Integration | Services for integrating applications ranging from cloud-to-cloud | PAAS |
| 14 | Billing | Application services to manage customers billing and usage and | SAAS |
| 15 | Collaboration | Platforms providing tools that allow users to collaborate in workgroups | SAAS |
| 16 | Content Management | Services for managing the production and access to content for web based | SAAS |
| 17 | CRM | Platforms for CRM application that range from call center applications to | SAAS |
| 18 | Document Management | Platforms of managing documents | SAAS |
| 19 | Environmental Health & Safety | Helps manufacturers manage and promote safe handling of hazardous | SAAS |
| 20 | ERP | Enterprise resource planning ERP is an integrated computer based system | SAAS |
| 21 | Financials | Applications for managing financial processes for companies that range from | SAAS |
| 22 | Health and Wellness | Services for improving and managing people health and well-being | SAAS |
| 23 | Human resources | Software for managing human resources functions within companies | SAAS |
| 24 | IT Services Management | Software that helps enterprise manage IT services delivery to services | SAAS |

TABLE 2

Cloud Services
Services Query.txt

| 25 | Personal Productivity | Software that business users use on a daily basis in the normal course of | SAAS |
|---|---|---|---|
| 26 | Personal Management | Software packages for managing projects. Features of package may | SAAS |
| 27 | Sales | Application that are specifically designed for sales functions such as | SAAS |
| 28 | Security | Hosted products fir security services such as malware and virus scanning | SAAS |
| 29 | Social Networks | Platforms for creating and customizing social networking applications | SAAS |
| 30 | Cloud Abstraction | Software libraries that provide an abstraction layer to avoid cloud vendor | Cloud Software |
| 31 | Cloud Integration | Software that helps enterprises integrate with cloud infrastructure servers | Cloud Software |
| 32 | Configuration Automation | Software that automates application configuration management on cloud | Cloud Software |
| 33 | Data | Database systems that meet the scalability of massive web based systems | Cloud Software |
| 34 | Distributed Cache | Provides data caching to accelerate the performance of large scale web | Cloud Software |
| 35 | Distributed Compute | Software that manages elastic compute resources where application can | Cloud Software |
| 36 | Infrastructure Management | Packages and tools for managing cloud scale systems that can be used to | Cloud Software |
| 37 | MapReduce | MapReduce comprises a category of software bases on MapReduce algorithm | Cloud Software |
| 38 | Multi-Cloud Business App | Cloud enabled business applications that are available on multiple cloud | Cloud Software |
| 39 | Paas Software | Software for building a PaaS on a public of private cloud. PaaS software | Cloud Software |
| 40 | SaaS Software | Software for building a SaaS on a public or private cloud | Cloud Software |
| 41 | Saas Data security | These services enhance the security of using SaaS systems by adding | Cloud Software |
| 42 | Search | Software that provides cloud scalable search capabilities on unstructured | Cloud Software |

It is important to note that while the present invention has been described in the context of a fully functioning computer system, those of ordinary skill in the art will appreciate that the methods of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital analog communications links, wired or wireless communications links using transmission forms, such as, for example, radio frequency and light wave transmissions. The computer readable media may take the form of coded formats that are decoded for actual use in a particular data processing system containing one or more programs.

Furthermore, it will be apparent to those of ordinary skill in the art that the method of conducting a negotiation between two parties may be executed by an article of manufacture comprising a machine readable medium containing one or more programs.

REFERENCES

[1] F. Baader, D. Calvanese, D. McGuinness, P. Patel-Schneider and D. Nardi, The description logic handbook: theory, implementation, and applications, Cambridge University Press, 2003
[2] T. Berners-Lee, D. Connolly, L. Kagal, Y. Scharf and J. Hendler, N3Logic: A logical framework for the World Wide Web, Theory and Practice of Logic Programming, v8n3, Cambridge Univ Press, 2008.

[3] D. Bianchini, V. De Antonellis, B. Pernici, P. Plebani, Ontology-based methodology for e-service discovery, International Journal of Information Systems, The Semantic Web and Web Services, Volume 31, Issues 4-5, June-July 2006, pp 361-380

[4] J. Black et al, An integration model for organizing IT service Management, IBM Systems Journal, VOL 46, NO 3, 2007

[5] B. Boehm. 1986. A spiral model of software development and enhancement. SIGSOFT Software Eng. Notes 11, 4 (August 1986), 14-24.

[6] M. Hepp, GoodRelations: An Ontology for Describing Products and Services Offers on the Web, Proceedings of the 16th International Conference on Knowledge Engineering and Knowledge Management (EKAW2008), Italy, 2008, Springer LNCS, Vol 5268, pp. 332-347.

[7] I. Horrocks, P. Patel-Schneider, H. Boley, S. Tabet, B. Grosof and M. Dean, SWRL: A semantic web rule language combining OWL and RuleML, W3C Member Submission, WWW Consortium, 2004.

[8] Jena-A Semantic Web Framework for Java, http://incubator.apache.org/jena/, retrieved on Mar. 13, 2012.

[9] Joseki-A SPARQL Server for Jena, http://www.joseki.org/, retrieved on Mar. 13, 2012.

[10] K. Joshi, T. Finin, Y. Yesha, Integrated Lifecycle of IT Services in a Cloud Environment, in Proceedings of The Third International Conference on the Virtual Computing Initiative (ICVCI 2009), October 2009

[11] K. Joshi, OWL Ontology for Lifecycle of IT Services on the Cloud, 2010, http://ebiquity.umbc.edu/ontologiesitso/1.0/itso.owl

[12] K. Joshi, A. Joshi and Y. Yesha, Managing the Quality of Virtualized Services, in proceedings of the SRII Global conference, March 2011.

[13] L. Kagal, C. Hanson, and D. Weitzner, Using dependency tracking to provide explanations for policy management, IEEE International Workshop on Policies for Distributed Systems and Networks, 2008.

[14] J. Kopecky, T. Vitvar, C. Bournez and J. Farrell, SAWSDL: Semantic annotations for WSDL and XML schema, IEEE Internet Computing, v11n6, pp. 60-67, 2007.

[15] O. Lassila, R. Swick and others, Resource Description Framework (RDF) Model and Syntax Specification, WWW Consortium, 1999.

[16] D. Martin, et al., Bringing semantics to web services: The OWL-S approach. Lecture Notes in Computer Science, volume 3387, pp. 26-42, 2005, Springer.

[17] E. M. Maximilien, M. Singh, A Framework and Ontology for Dynamic Web Services Selection, IEEE Internet Computing, vol. 8, no. 5, pp. 8493, September/October 2004

[18] D. McGuinness, F. Van Harmelen, et al., OWL web ontology language overview, W3C recommendation, World Wide Web Consortium, 2004.

[19] NIST Special Publication 800-145, "The NIST Definition of Cloud Computing", September 2011.

[20] NIST Special Publication 500-292, "NIST Cloud Computing Reference Architecture", November 2011.

[21] D. Nurmi, R. Wolski, C. Grzegorczyk, G. Obertelli, S. Soman, L. Youseff, D. Zagorodnov, "The *eucalyptus* open-source cloudcomputing system", 9th IEEE/ACM International Symposium on Cluster Computing and the Grid, pp 124-131, 2009

[22] M. Papazoglou and W. Van Den Heuvel, Service-oriented design and development methodology, International Journal of Web Engineering and Technology, Volume 2, Number 4, 2006, pp. 412-442

[23] S. Paurobally, V. Tamma and M. Wooldrdige, A Framework for Web Service Negotiation. ACM Transactions on Autonomous and Adaptive Systems, Vol. 2, No. 4, Article 14, November 2007.

[24] E. Prud'hommeaux and A. Seabome, SPARQL Query Language for RDF, W3C recommendation January 2008, http://www.w3.org/TR/rdfsparql-query/, retrieved on Sep. 4, 2012

[25] S Ran, A model for web services discovery with QoS, ACM SIGecom Exchanges, Vol 4, Issue 1, 2003, pp 1-10, 2003

[26] M. L. Sbodio, D. Martin, and C. Moulin, "Discovering Semantic Web services using SPARQL and intelligent agents." Journal of Web Semant. 8, 4 (November 2010), 310-328.

[27] A. Sheth, K. Gomadam, A. Ranabahu, Semantics enhanced Services: METEOR-S, SAWSDL and SA-REST, IEEE Data Eng. Bull., 31(3), 8-12

[28] 'Whats in a Service Level Agreement?', SLA@SOI. http://sla-atsoi.eu/?p=356, retrieved on Mar. 13, 2012.

[29] R. Smith, The Contract Net Protocol: High-Level Communication and Control in a Distributed Problem Solver, IEEE Transactions on computers, Volume C-29, Issue 12, 1980, pp 1104-1113.

[30] SPARQL Endpoint, http-/semanticweb.org/wiki/SPARQL_endpoint, retrieved on Mar. 13, 2012.

[31] J Van Bon et. al., Foundations of IT service management based on ITIL V3, Van Haten Publishing, 2008

[32] G. Williams, SPARQL Service Description, http://www.w3.org/TR2009/WD-sparql11-service-description-20091022/.

[33] L Zeng, B. Benatallah, M. Dumas, J. Kalagnanam, Q. Sheng, Quality driven web services composition, Proceedings of the 12th international conference on World Wide Web, 2003, pp 411-421.

[34] K. Ren, N. Xiao, J. Chen, "Building Quick Service Query List Using WordNet and Multiple Heterogeneous Ontologies toward More Realistic Service Composition," IEEE Transactions on Services Computing, vol. 4, no. 3, pp. 216-229, 2011.

[35] Paliwal, A.; Shafiq, B.; Vaidya, J.; Xiong, H.; Adam, N.; "Semantics Based Automated Service Discovery," Services Computing, IEEE Transactions on, vol. PP, no.99, pp. 1, 0.

[36] NIST Cloud Computing Use Case 3.9: Query Cloud-Provider Capabilities and Capacities, http://www.nist.gov/itl,cloud/3_9.cfm, retrieved on Feb. 25, 2012

[37] IBM VCL: A Cloud Computing Solution in Universities, http://www.ibm.com/developerworks/webservices/library/ws-vcl/, retrieved on Feb. 25, 2012

[38] M Xu, Z Hu, W Long, W Liu, Service virtualization: Infrastructure and applications—The Grid: Blueprint for a New Computing Infrastructure, I. Foster, C. Kesselman, Morgan Kaufman, 2004

[39] D. De Roure et. al., The Semantic Grid: Past, Present, and Future, Proceedings of the IEEE, vol. 93, No. 3, March 2005

[40] T Domemann, E Juhnke, B Freisleben, On-Demand Resource Provisioning for BPEL Workflows Using Amazon's Elastic Compute Cloud, proc. of CCGrid, 2009.

[41] C. Crawford, G. Bate, L. Cherbakov, K. Holley, C. Tsocanos, Toward an on demand service-oriented architecture, IBM Systems Journal, Vol 44, Issue 1, pp 81-107, 2005

[42] Quan Z. Sheng, et al. Configurable Composition and Adaptive Provisioning of Web Services, IEEE Transactions on Services Computing, Vol. 2. No. 1. January-March 2009

[43] Mike Boniface, et al., Dynamic Service Provisioning Using GRIA SLAs Service-Oriented Computing— ICSOC 2007

[44] Ana Juan Ferrer, et al, OPTIMIS: A holistic approach to cloud service provisioning, FGCS, 2011.

[45] D. Chakraborty. F. Perch, S. Avancha and A. Joshi, "DReggie: Semantic Service Discovery for M-Commerce Applications", Workshop on Reliable and Secure Applications in Mobile Environment, Symposiom on Reliable Distributed Systems, 2001

[46] NIST Special Publication 500-293, US Government Cloud Computing Technology Roadmap Volume I Release 1.0 (Draft) HighPriority Requirements to Further USG Agency CloudComputing Adoption, November 2011.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A method of facilitating dynamic bilateral generation of a service level agreement between a service consumer and a service provider, wherein the service consumer interacts with a graphical user interface, the graphical user interface being generated and rendered on a display of an electronic device, by executing a software product on a computing hardware of the electronic device, the computing hardware, graphical user interface and the software product being implemented on a service consumer computer system that is operatively connected to a network of remote internet computers, and a plurality of remote service providers accessible by the network of remote internet computers, the method comprising the following steps:

i. rendering within the graphical user interface a request for service object, a discover services object, a negotiate service level agreement object, a compose services object, a service attributes object, and a data and security policies object;

ii. generating an initial soft constraint comprising at least four (4) requirements comprising requirement 1 (R1), requirement 2 (R2), requirement 3 (R3), and requirement 4 (R4) (R1+R2+R3+R4) on the service consumer computer system to validate an initial search using a generated search agent Consumer Search Agent 1 (CSA1), wherein the requirements are selected from the group comprising: Service cost, Service certification, Service begin date, Service end date, Security policy, Service availability, Quality of service name, Quality of Service metrics, Penalty, Service monitoring, Service payment, Provider experience, Provider availability, Provider nationality, Consumer nationality, Technical specifications, Operating system, Hardware, Hardware constraints, VM separation, Data deletion prior to resource release, Data deletion security, Cloud location, Application software, Compatible application details, Storage size, Cloud availability, Data Backup, Data Encryption, Data Location, Storage interface, Trusted Internet Connection (TIC) separation, Connection compliance evaluation assurance level, Server type, User authentication, Cloud instance size, Cloud instance speed, Cloud instance cores, Outage escalation time, Outage notification, Outage resolution, Outage response time, Functional specifications for tasks and descriptions, cloud service layer, Service laver IAAS PAAS SAAS, Service domain, Service domain characteristics, Broker ID, Broker service, Broker service ranking, Consumer ID, Consumer description, Cloud auditor, Broker verification, Broker security audit, Broker performance audit, Broker privacy audit, Currency, Pricing model, Relaxation type, Business entity, Telephone support, Support metrics, Domain metrics, Business continuity plan, Scheduled maintenance, Support timeframe, Dependent subcontract, OWL-S process, SPARQL process, Hybrid Human-Automated Service Level Agreement, Assurance, Reliability, Throughput, Latency, Performance, Response time, and Dependent components;

(iii) said CSA1 executing a search for providers which provide service according to requirements R1+R2+R3+R4 by sending a request to the plurality of remote service providers, said CSA1 generating a list of possible providers from each reply received from the plurality of remote service providers, said CSA1 receiving each reply and displaying a No Matches— notification to the service consumer graphical user interface, and said CSA1 sending a Service Provider Identity Requested notification to a plurality of service provider graphical user interfaces with the requirements R1+R2+R3+R4, said requirements comprising a combination of functional and non-functional requirements in a machine understandable knowledge representation language to automatically generate a document that uses the initial soft constraint by detecting a selection of one or more service attribute constraints within the service attributes graphical object, and detecting a selection of one or more data and security policy constraints within the data and security policies graphical object, the machine understandable knowledge representation language selected from the group consisting of: RDF, OWL, and the functional equivalents of RDF and OWL said Provider Identity Requested notification sent using semantic web technology to form a federated SPARQL query cloud agent representing the initial soft constraint and sending a Request for Service from the service consumer computer system to the plurality of remote service providers, wherein said Request for Service specifies the requirements R1+R2+R3+R4 of the initial soft constraint;

(iv) receiving at the computer system of the service consumer a list of matching services for service providers that match the first constraints group, and where the list of matching services contains zero service providers;

(v) generating Consumer Search Agent 2 (CSA2) on the service consumer computer system by relaxing one requirement and forming requirements Relaxed1+R2+R3+R4, said CSA2 executing a search for providers which provide service according to requirements Relaxed1+R2+R3+R4 by sending a second request to the plurality of remote service providers, said CSA2 generating a list of possible providers from each second reply received from the plurality of remote service providers, said CSA2 receiving each second reply and displaying a second No Matches-notification to the service consumer graphical user interface, and said CSA2 sending a Provider Counteroffer Requested notification to the plurality of service provider computer systems with the requirements Relaxed1+R2+R3+R4, said requirements Relaxed1+R2+R3+R4 comprising a combination of functional and non-functional requirements in a machine understandable knowledge representation language to automatically generate a document that uses the requirements by detecting a selection of one or more service attribute constraints within the service attributes graphical object, and detecting a selection of one or more data and security policy constraints within the data and security policies graphical object, the machine understandable knowledge representation language selected from the group consisting of: RDF, OWL, and the functional equivalents of RDF and OWL, said Provider Counteroffer Requested notifications sent using semantic web technology to form a federated SPARQL query cloud agent representing the requirements and sending a Request for Service from the service consumer computer system to the plurality of remote service providers, wherein said Request for Service specifies the requirements Relaxed1+R2+R3+R4;

(vi) generating a Provider Search Agent (PSA1) to obtain provider capacity, market availability, and market pricing by sending a request to each service provider computer system listed in the second list of possible providers;

(vii) receiving data from the PSA1 comprising provider capacity, market availability, and market pricing and sending the PSA1 data to each service provider computer system that responds to the PSA1 request, and generating a Service Provider Counteroffer having requirements R1+Relaxed2+R3+R4 from at least one service provider computer system;

(viii) sending the Service Provider Counteroffer having requirements R1+Relaxed2+R3+R4 to the service consumer computer system and displaying on the GUI for evaluation;

(ix) generating on the service consumer computer system a re-check CSA1 (R-CSA1) executing a search for providers which provide service according to requirements R1+R2+R3+R4 by sending a request to the plurality of remote service provider computer systems, said R-CSA1 generating a R-CSA1 list of possible providers from each R-CSA1 reply received from the plurality of remote service provider computer systems, said R-CSA1 receiving each R-CSA1 reply and displaying the R-CSA1 reply to the service consumer graphical user interface;

(x) automatically generating a Service Level Agreement 1 (SLA1) if one of the R-CSA1 replies is a match to CSA1 requirements R1+R2+R3+R4 and sending the SLA1 to the remote service provider computer system that sent the match and sending an End Negotiation notification to the remaining remote service provider computer systems, or generating a re-check CSA2 (R-CSA2) on the service consumer computer system if none of the R-CSA1 replies is a match to CSA1 requirements R1+R2+R3+R4 and executing a R-CSA2 search for providers which provide service according to requirements Relaxed1+R2+R3+R4 by sending a R-CSA2 request to each of the plurality of remote service provider computer systems that did not generate counteroffer R1+Relaxed2+R3+R4, said R-CSA2 generating a R-CSA2 list of possible providers from each R-CSA2 reply received from the plurality of remote service provider computer systems, said R-CSA2 receiving each R-CSA2 reply and displaying each R-CSA2 reply to the service consumer graphical user interface;

(xi) automatically generating a Service Level Agreement 2 (SLA2) if one of the R-CSA2 replies is a match to CSA2 requirements Relaxed1+R2+R3+R4 and sending the SLA2 to the remote service provider computer system that sent the match and sending an End Negotiation notification to the remaining remote service provider computer systems, or generating CSA3 Service Consumer Counteroffer having requirements Relaxed1+R2+Relaxed3+Relaxed4 on the service consumer computer system if none of the R-CSA2 replies is a match to CSA2 having requirements Relaxed1+R2+R3+R4, and sending the CSA3 service consumer counteroffer to the plurality of remote service provider computer systems;

(xii) generating a Provider Search Agent 2 (PSA2) to obtain updated service provider capacity, updated market availability, and updated market pricing by sending a request to each service provider computer system listed in the second list of possible providers;

(xiii) receiving updated data from the PSA2 comprising updated provider capacity, updated market availability, and updated market pricing and sending the updated data to each service provider computer system that responds to the PSA2 request;

(xiv) automatically generating a Service Level Agreement 3 (SLA3) on the remote service provider computer system that sent the match if one of the CSA3 replies is a match to CSA3 requirements Relaxed1+R2+Relaxed3+Relaxed4 and sending the SLA3 to the service consumer computer system, and the service consumer computer system sending an End Negotiation notification to the remaining remote service provider computer systems, or generating a second re-check CSA2 (SR-CSA2) on the service consumer computer system if none of the CSA3 replies is a match to CSA3 requirements Relaxed1+R2+Relaxed3+Relaxed4 and executing a SR-CSA2 search for providers which provide service according to requirements Relaxed1+R2+R3+R4 by sending a SR-CSA2 request to each of the plurality of remote service provider computer systems that did not generate counteroffer R1+Relaxed2+R3+R4, said SR-CSA2 generating a SR-CSA2 list of possible providers from each SR-CSA2 reply received from the plurality of remote service provider computer systems, said SR-CSA2 receiving each SR-CSA2 reply and displaying each SR-CSA2 reply to the service consumer graphical user interface;

(xv) automatically generating a Service Level Agreement 4 (SLA4) on the service consumer computer system if one of the SR-CSA2 replies is a match to SR-CSA2 requirements Relaxed1+R2+R3+R4 and sending the SLA4 to the service provider computer system that sent the match, and the service consumer computer system sending an End Negotiation notification to the remaining remote service provider computer systems, or automatically generating a Service Level Agreement 5 (SLA5) with the remote service provider computer system in Step (vii) that generated Service Provider Counteroffer having requirements R1+Relaxed2+R3+R4 if none of the SR-CSA2 replies is a match to SR-CSA2 having requirements Relaxed1+R2+R3+R4, and sending the SLA5 to the service provider computer system in Step (vii) that sent the match, and the service consumer computer system sending an End Negotiation notification to the remaining remote service provider computer systems;

wherein the step of sending in each of the steps is performed by generating a secondary federated SPARQL query cloud agent, wherein the secondary federated SPARQL query cloud agent is a Request for Service wherein the service consumer computer system is in direct communication with the plurality of service provider computer systems, without using an intermediary service level agreement broker; and, wherein the service specified by the requirements is not a pre-existing service and is not specified until the service level agreement is generated.

* * * * *